United States Patent
Rexer

(10) Patent No.: US 10,915,492 B2
(45) Date of Patent: Feb. 9, 2021

(54) CLOUD-BASED PLATFORM ENABLED WITH MEDIA CONTENT INDEXED FOR TEXT-BASED SEARCHES AND/OR METADATA EXTRACTION

(71) Applicant: Box, Inc., Los Altos, CA (US)

(72) Inventor: Peter Rexer, San Carlos, CA (US)

(73) Assignee: Box, Inc., Redwood City, CA (US)

( * ) Notice: Subject to any disclaimer, the term of this patent is extended or adjusted under 35 U.S.C. 154(b) by 370 days.

(21) Appl. No.: 13/829,663

(22) Filed: Mar. 14, 2013

(65) Prior Publication Data

US 2014/0082091 A1  Mar. 20, 2014

Related U.S. Application Data

(60) Provisional application No. 61/702,948, filed on Sep. 19, 2012.

(51) Int. Cl.
*G06F 15/16* (2006.01)
*G06F 15/173* (2006.01)
(Continued)

(52) U.S. Cl.
CPC ...... *G06F 15/17306* (2013.01); *G06F 16/433* (2019.01); *G06F 16/958* (2019.01); *G06Q 10/00* (2013.01)

(58) Field of Classification Search
USPC ........................................................ 709/205
See application file for complete search history.

(56) References Cited

U.S. PATENT DOCUMENTS

| 858,619 A | 7/1907 | O'Farrell |
| 5,043,876 A | 8/1991 | Terry |

(Continued)

FOREIGN PATENT DOCUMENTS

| CA | 2724521 | 11/2009 |
| CN | 101997924 A | 3/2011 |

(Continued)

OTHER PUBLICATIONS

"Average Conversion Time for a D60 RAW file?" http://www.dpreview.com, Jul. 22, 2002, 4 pages.

(Continued)

*Primary Examiner* — SM A Rahman
(74) *Attorney, Agent, or Firm* — Sheridan Ross P.C.

(57) ABSTRACT

Techniques are disclosed for enabling collaborative work on a media content among collaborators through a cloud-based environment. An example method comprises receiving the media content; extracting a plurality of text-based data based on the media content; and indexing the plurality of text-based data so as to enable one or more actions to be performed on the media content using the plurality of text-based data. In some embodiments, the media content comprises an audio component, and the method further comprises transcribing the audio component of the media content so that the plurality of text-based data comprises a transcript of the media content. In some embodiments, the actions include a text-based search or a semantics-based search. Among other benefits, some embodiments provided herein enable indexing media content for text-based searches and/or metadata extraction to effectively manage multimedia files in a cloud-based storage/service environment.

28 Claims, 6 Drawing Sheets

(51) Int. Cl.
  *G06Q 10/00* (2012.01)
  *G06F 16/958* (2019.01)
  *G06F 16/432* (2019.01)

(56) References Cited

U.S. PATENT DOCUMENTS

| | | |
|---|---|---|
| 5,748,735 A | 5/1998 | Ganesan |
| 5,774,717 A | 6/1998 | Porcaro |
| 5,787,175 A | 7/1998 | Carter |
| 5,799,320 A | 8/1998 | Klug |
| 5,835,667 A * | 11/1998 | Wactlar ............... G11B 27/034 386/241 |
| 5,848,415 A | 12/1998 | Guck |
| 5,864,870 A | 1/1999 | Guck |
| 5,999,908 A | 12/1999 | Abelow |
| 6,016,467 A | 1/2000 | Newsted et al. |
| 6,034,621 A | 3/2000 | Kaufman |
| 6,055,543 A | 4/2000 | Christensen et al. |
| 6,073,161 A | 6/2000 | DeBoskey et al. |
| 6,098,078 A | 8/2000 | Gehani et al. |
| 6,226,618 B1 | 5/2001 | Downs et al. |
| 6,233,600 B1 | 5/2001 | Salas et al. |
| 6,260,040 B1 | 7/2001 | Kauffman et al. |
| 6,289,345 B1 | 9/2001 | Yasue |
| 6,292,803 B1 | 9/2001 | Richardson et al. |
| 6,336,124 B1 | 1/2002 | Alam et al. |
| 6,342,906 B1 | 1/2002 | Kumar et al. |
| 6,345,386 B1 | 2/2002 | Delo et al. |
| 6,370,543 B2 | 4/2002 | Hoffert et al. |
| 6,374,260 B1 | 4/2002 | Hoffert et al. |
| 6,385,606 B2 | 5/2002 | Inohara et al. |
| 6,396,593 B1 | 5/2002 | Laverty et al. |
| 6,441,641 B1 | 8/2002 | Pang et al. |
| 6,515,681 B1 | 2/2003 | Knight |
| 6,539,381 B1 | 3/2003 | Prasad et al. |
| 6,584,466 B1 | 6/2003 | Serbinis et al. |
| 6,636,872 B1 | 10/2003 | Heath et al. |
| 6,636,897 B1 | 10/2003 | Sherman et al. |
| 6,654,737 B1 | 11/2003 | Nunez |
| 6,662,186 B1 | 12/2003 | Esquibel et al. |
| 6,687,878 B1 | 2/2004 | Eintracht et al. |
| 6,714,968 B1 | 3/2004 | Prust |
| 6,735,623 B1 | 5/2004 | Prust |
| 6,742,181 B1 | 5/2004 | Koike et al. |
| 6,760,721 B1 | 7/2004 | Chasen et al. |
| 6,947,162 B2 | 9/2005 | Rosenberg et al. |
| 6,952,724 B2 | 10/2005 | Prust |
| 6,996,768 B1 | 2/2006 | Elo et al. |
| 7,003,667 B1 | 2/2006 | Slick et al. |
| 7,010,752 B2 | 3/2006 | Ly |
| 7,020,697 B1 | 3/2006 | Goodman et al. |
| 7,039,806 B1 | 5/2006 | Friedman et al. |
| 7,069,393 B2 | 6/2006 | Miyata et al. |
| 7,130,831 B2 | 10/2006 | Howard et al. |
| 7,133,834 B1 | 11/2006 | Abelow |
| 7,143,136 B1 | 11/2006 | Drenan et al. |
| 7,149,787 B1 | 12/2006 | Mutalik et al. |
| 7,152,182 B2 | 12/2006 | Ji et al. |
| 7,155,483 B1 | 12/2006 | Friend et al. |
| 7,165,107 B2 | 1/2007 | Pouyoul et al. |
| 7,178,021 B1 | 2/2007 | Hanna et al. |
| 7,222,078 B2 | 5/2007 | Abelow |
| 7,275,244 B1 | 9/2007 | Charles Bell et al. |
| 7,296,025 B2 | 11/2007 | Kung et al. |
| 7,346,778 B1 | 3/2008 | Guiter et al. |
| 7,353,252 B1 | 4/2008 | Yang et al. |
| 7,362,868 B2 | 4/2008 | Madoukh et al. |
| 7,363,330 B1 | 4/2008 | Ellman et al. |
| 7,370,269 B1 | 5/2008 | Prabhu et al. |
| 7,386,535 B1 | 6/2008 | Kalucha et al. |
| 7,401,117 B2 | 7/2008 | Dan et al. |
| 7,543,000 B2 | 6/2009 | Castro et al. |
| 7,581,221 B2 | 8/2009 | Lai et al. |
| 7,620,565 B2 | 11/2009 | Abelow |
| 7,647,559 B2 | 1/2010 | Yozell-Epstein et al. |
| 7,650,367 B2 | 1/2010 | Arruza |
| 7,661,088 B2 | 2/2010 | Burke |
| 7,665,093 B2 | 2/2010 | Maybee et al. |
| 7,676,542 B2 | 3/2010 | Moser et al. |
| 7,698,363 B2 | 4/2010 | Dan et al. |
| 7,734,600 B1 | 6/2010 | Wise et al. |
| 7,756,843 B1 | 7/2010 | Palmer |
| 7,774,412 B1 | 8/2010 | Schnepel |
| 7,814,426 B2 | 10/2010 | Huesken et al. |
| 7,886,287 B1 | 2/2011 | Davda |
| 7,886,295 B2 | 2/2011 | Burger et al. |
| 7,890,964 B2 | 2/2011 | Vogler-Ivashchanka et al. |
| 7,937,663 B2 | 5/2011 | Parker et al. |
| 7,958,353 B2 | 6/2011 | Matsuzaki et al. |
| 7,958,453 B1 | 6/2011 | Taing |
| 7,979,296 B2 | 7/2011 | Kruse et al. |
| 7,996,374 B1 | 8/2011 | Jones et al. |
| 8,027,976 B1 | 9/2011 | Ding et al. |
| RE42,904 E | 11/2011 | Stephens, Jr. |
| 8,065,739 B1 | 11/2011 | Bruening et al. |
| 8,090,361 B2 | 1/2012 | Hagan |
| 8,140,513 B2 | 3/2012 | Ghods et al. |
| 8,151,183 B2 | 4/2012 | Chen et al. |
| 8,185,830 B2 | 5/2012 | Saha et al. |
| 8,200,582 B1 | 6/2012 | Zhu |
| 8,214,747 B1 | 7/2012 | Yankovich et al. |
| 8,230,348 B2 | 7/2012 | Peters et al. |
| 8,239,918 B1 | 8/2012 | Cohen |
| 8,326,814 B2 | 12/2012 | Ghods et al. |
| 8,347,276 B2 | 1/2013 | Schadow |
| 8,358,701 B2 | 1/2013 | Chou et al. |
| 8,370,803 B1 | 2/2013 | Holler et al. |
| 8,429,540 B1 | 4/2013 | Yankovich et al. |
| 8,464,161 B2 | 6/2013 | Giles et al. |
| 8,479,238 B2 * | 7/2013 | Chen ................... G06F 16/738 725/86 |
| 8,515,902 B2 | 8/2013 | Savage |
| 8,527,549 B2 | 9/2013 | Cidon |
| 8,549,066 B1 | 10/2013 | Donahue et al. |
| 8,549,511 B2 | 10/2013 | Seki et al. |
| 8,582,777 B2 | 11/2013 | Urivskiy et al. |
| 8,583,619 B2 | 11/2013 | Ghods et al. |
| 8,607,306 B1 | 12/2013 | Bridge et al. |
| 8,650,498 B1 | 2/2014 | Mihovilovic |
| 8,719,445 B2 | 5/2014 | Ko |
| 8,745,267 B2 | 6/2014 | Luecke et al. |
| 8,782,637 B2 | 7/2014 | Khalid |
| 8,825,597 B1 | 9/2014 | Houston et al. |
| 8,849,955 B2 | 9/2014 | Prahlad et al. |
| 8,868,574 B2 | 10/2014 | Kiang et al. |
| 8,892,679 B1 | 11/2014 | Destagnol et al. |
| 8,914,856 B1 | 12/2014 | Velummylum et al. |
| 8,914,900 B2 | 12/2014 | Smith et al. |
| 8,918,387 B1 | 12/2014 | Sokolov |
| 8,949,939 B2 | 2/2015 | Peddada |
| 8,959,579 B2 | 2/2015 | Barton et al. |
| 8,966,062 B1 * | 2/2015 | Giese et al. ............... 709/224 |
| 8,990,955 B2 | 3/2015 | Hymel et al. |
| 9,495,364 B2 | 11/2016 | Savage et al. |
| 2001/0027492 A1 | 10/2001 | Gupta |
| 2002/0029218 A1 | 3/2002 | Bentley et al. |
| 2002/0091738 A1 | 7/2002 | Rohrabaugh et al. |
| 2002/0099772 A1 | 7/2002 | Deshpande et al. |
| 2002/0116544 A1 | 8/2002 | Barnard et al. |
| 2002/0133509 A1 | 9/2002 | Johnston et al. |
| 2002/0147770 A1 | 10/2002 | Tang |
| 2002/0194177 A1 | 12/2002 | Sherman et al. |
| 2003/0041095 A1 | 2/2003 | Konda et al. |
| 2003/0043191 A1 | 3/2003 | Tinsley et al. |
| 2003/0084306 A1 | 5/2003 | Abburi et al. |
| 2003/0093404 A1 | 5/2003 | Bader et al. |
| 2003/0108052 A1 | 6/2003 | Inoue et al. |
| 2003/0110264 A1 | 6/2003 | Whidby et al. |
| 2003/0115326 A1 | 6/2003 | Verma et al. |
| 2003/0135536 A1 | 7/2003 | Lyons |
| 2003/0135565 A1 | 7/2003 | Estrada |
| 2003/0154306 A1 | 8/2003 | Perry |
| 2003/0217171 A1 | 11/2003 | Von Stuermer et al. |
| 2003/0228015 A1 | 12/2003 | Futa et al. |

(56) References Cited

U.S. PATENT DOCUMENTS

| | | |
|---|---|---|
| 2004/0006576 A1* | 1/2004 | Colbath .............. G10L 25/78 |
| 2004/0021765 A1* | 2/2004 | Kubala ............... H04N 7/15 |
| | | 348/14.08 |
| 2004/0088647 A1 | 5/2004 | Miller et al. |
| 2004/0098361 A1 | 5/2004 | Peng |
| 2004/0103147 A1 | 5/2004 | Flesher et al. |
| 2004/0111415 A1 | 6/2004 | Scardino et al. |
| 2004/0117438 A1 | 6/2004 | Considine et al. |
| 2004/0122949 A1 | 6/2004 | Zmudzinski et al. |
| 2004/0128359 A1 | 7/2004 | Horvitz et al. |
| 2004/0152055 A1* | 8/2004 | Gliessner ............. G09B 5/06 |
| | | 434/169 |
| 2004/0177138 A1 | 9/2004 | Salle et al. |
| 2004/0181579 A1 | 9/2004 | Huck et al. |
| 2004/0196307 A1 | 10/2004 | Zak et al. |
| 2004/0201604 A1 | 10/2004 | Kraenzel et al. |
| 2004/0218214 A1 | 11/2004 | Kihara et al. |
| 2004/0230624 A1 | 11/2004 | Frolund et al. |
| 2004/0246532 A1 | 12/2004 | Inada |
| 2004/0267836 A1 | 12/2004 | Armangau et al. |
| 2005/0005276 A1 | 1/2005 | Morgan |
| 2005/0010860 A1 | 1/2005 | Weiss et al. |
| 2005/0022229 A1 | 1/2005 | Gabriel et al. |
| 2005/0028006 A1 | 2/2005 | Leser et al. |
| 2005/0038997 A1 | 2/2005 | Kojima et al. |
| 2005/0050228 A1 | 3/2005 | Perham et al. |
| 2005/0055306 A1 | 3/2005 | Miller et al. |
| 2005/0063083 A1 | 3/2005 | Dart et al. |
| 2005/0097225 A1 | 5/2005 | Glatt et al. |
| 2005/0102328 A1 | 5/2005 | Ring et al. |
| 2005/0108406 A1 | 5/2005 | Lee et al. |
| 2005/0114305 A1 | 5/2005 | Haynes et al. |
| 2005/0114378 A1 | 5/2005 | Elien et al. |
| 2005/0138118 A1 | 6/2005 | Banatwala et al. |
| 2005/0182966 A1 | 8/2005 | Pham et al. |
| 2005/0198299 A1 | 9/2005 | Beck et al. |
| 2005/0198452 A1 | 9/2005 | Watanabe |
| 2005/0234864 A1 | 10/2005 | Shapiro |
| 2005/0234943 A1 | 10/2005 | Clarke |
| 2005/0261933 A1 | 11/2005 | Magnuson |
| 2006/0005163 A1 | 1/2006 | Huesken et al. |
| 2006/0026502 A1 | 2/2006 | Dutta |
| 2006/0026535 A1 | 2/2006 | Hotelling et al. |
| 2006/0031216 A1* | 2/2006 | Semple ................. G06F 16/71 |
| 2006/0036568 A1 | 2/2006 | Moore et al. |
| 2006/0041603 A1 | 2/2006 | Paterson et al. |
| 2006/0041752 A1 | 2/2006 | Tuvell et al. |
| 2006/0047804 A1 | 3/2006 | Fredricksen et al. |
| 2006/0053088 A1 | 3/2006 | Ali et al. |
| 2006/0053380 A1 | 3/2006 | Spataro et al. |
| 2006/0070083 A1 | 3/2006 | Brunswig et al. |
| 2006/0075071 A1 | 4/2006 | Gillette |
| 2006/0089857 A1* | 4/2006 | Zimmerman .......... G06F 19/322 |
| | | 705/2 |
| 2006/0117247 A1 | 6/2006 | Fite et al. |
| 2006/0133340 A1 | 6/2006 | Rybak et al. |
| 2006/0168550 A1 | 7/2006 | Muller et al. |
| 2006/0174051 A1 | 8/2006 | Lordi et al. |
| 2006/0174054 A1 | 8/2006 | Matsuki |
| 2006/0179070 A1 | 8/2006 | George et al. |
| 2006/0179309 A1 | 8/2006 | Cross et al. |
| 2006/0242204 A1 | 10/2006 | Karas et al. |
| 2006/0242206 A1 | 10/2006 | Brezak et al. |
| 2006/0259524 A1 | 11/2006 | Horton |
| 2006/0265719 A1 | 11/2006 | Astl et al. |
| 2006/0271510 A1 | 11/2006 | Harward et al. |
| 2006/0288043 A1 | 12/2006 | Novak et al. |
| 2007/0016680 A1 | 1/2007 | Burd et al. |
| 2007/0038934 A1 | 2/2007 | Fellman |
| 2007/0067349 A1 | 3/2007 | Jhaveri et al. |
| 2007/0079242 A1 | 4/2007 | Jolley et al. |
| 2007/0100830 A1 | 5/2007 | Beedubail et al. |
| 2007/0115845 A1 | 5/2007 | Hochwarth et al. |
| 2007/0118598 A1 | 5/2007 | Bedi et al. |
| 2007/0124460 A1 | 5/2007 | McMullen et al. |
| 2007/0124737 A1 | 5/2007 | Wensley et al. |
| 2007/0124781 A1 | 5/2007 | Casey et al. |
| 2007/0126635 A1 | 6/2007 | Houri |
| 2007/0130143 A1 | 6/2007 | Zhang et al. |
| 2007/0130163 A1 | 6/2007 | Perez et al. |
| 2007/0162610 A1 | 7/2007 | Un et al. |
| 2007/0198609 A1 | 8/2007 | Black et al. |
| 2007/0208878 A1 | 9/2007 | Barnes-Leon et al. |
| 2007/0214180 A1 | 9/2007 | Crawford |
| 2007/0220016 A1 | 9/2007 | Estrada et al. |
| 2007/0220590 A1 | 9/2007 | Rasmussen et al. |
| 2007/0240057 A1 | 10/2007 | Satterfield et al. |
| 2007/0250762 A1 | 10/2007 | Mansfield |
| 2007/0256065 A1 | 11/2007 | Heishi et al. |
| 2007/0266304 A1 | 11/2007 | Fletcher et al. |
| 2007/0282848 A1 | 12/2007 | Kiilerich et al. |
| 2007/0283443 A1 | 12/2007 | McPherson et al. |
| 2007/0288290 A1 | 12/2007 | Motoyama et al. |
| 2008/0005135 A1 | 1/2008 | Muthukrishnan et al. |
| 2008/0005195 A1 | 1/2008 | Li |
| 2008/0016146 A1 | 1/2008 | Gan et al. |
| 2008/0021959 A1 | 1/2008 | Naghi et al. |
| 2008/0040173 A1 | 2/2008 | Aleong et al. |
| 2008/0040503 A1 | 2/2008 | Kleks et al. |
| 2008/0046828 A1 | 2/2008 | Bibliowicz et al. |
| 2008/0052358 A1 | 2/2008 | Beaven et al. |
| 2008/0059656 A1 | 3/2008 | Saliba et al. |
| 2008/0063210 A1 | 3/2008 | Goodman et al. |
| 2008/0065881 A1 | 3/2008 | Dawson et al. |
| 2008/0077631 A1 | 3/2008 | Petri |
| 2008/0089665 A1* | 4/2008 | Thambiratnam ...... G11B 27/28 |
| | | 386/241 |
| 2008/0091763 A1 | 4/2008 | Devonshire et al. |
| 2008/0091790 A1 | 4/2008 | Beck |
| 2008/0104277 A1 | 5/2008 | Tian |
| 2008/0114720 A1 | 5/2008 | Smith et al. |
| 2008/0133674 A1 | 6/2008 | Knauerhase et al. |
| 2008/0140732 A1 | 6/2008 | Wilson et al. |
| 2008/0147790 A1 | 6/2008 | Malaney et al. |
| 2008/0151817 A1 | 6/2008 | Fitchett et al. |
| 2008/0154873 A1 | 6/2008 | Redlich et al. |
| 2008/0155540 A1* | 6/2008 | Mock ..................... G06Q 10/06 |
| | | 718/100 |
| 2008/0182628 A1 | 7/2008 | Lee et al. |
| 2008/0183467 A1 | 7/2008 | Yuan et al. |
| 2008/0184130 A1 | 7/2008 | Tien et al. |
| 2008/0194239 A1 | 8/2008 | Hagan |
| 2008/0215883 A1 | 9/2008 | Fok et al. |
| 2008/0222654 A1 | 9/2008 | Xu et al. |
| 2008/0228581 A1* | 9/2008 | Yonezaki ............... G06Q 30/02 |
| | | 705/14.4 |
| 2008/0243855 A1 | 10/2008 | Prahlad et al. |
| 2008/0250333 A1 | 10/2008 | Reeves et al. |
| 2008/0250348 A1 | 10/2008 | Alimpich et al. |
| 2008/0263099 A1 | 10/2008 | Brady-Kalnay et al. |
| 2008/0270110 A1* | 10/2008 | Yurick ............... G06F 17/30026 |
| | | 704/3 |
| 2008/0271095 A1 | 10/2008 | Shafton |
| 2008/0276158 A1 | 11/2008 | Lim et al. |
| 2008/0294899 A1 | 11/2008 | Gazzetta et al. |
| 2009/0015864 A1 | 1/2009 | Hasegawa |
| 2009/0019093 A1 | 1/2009 | Brodersen et al. |
| 2009/0019426 A1 | 1/2009 | Baeumer et al. |
| 2009/0030710 A1 | 1/2009 | Levine |
| 2009/0043848 A1* | 2/2009 | Kordun ............... H04L 12/1831 |
| | | 709/205 |
| 2009/0044128 A1 | 2/2009 | Baumgarten et al. |
| 2009/0049131 A1 | 2/2009 | Lyle et al. |
| 2009/0063995 A1 | 3/2009 | Baron et al. |
| 2009/0119169 A1* | 5/2009 | Chandratillake ...................... |
| | | G06F 17/30796 |
| | | 705/14.46 |
| 2009/0119322 A1 | 5/2009 | Mills et al. |
| 2009/0125469 A1 | 5/2009 | McDonald et al. |
| 2009/0132651 A1 | 5/2009 | Roger et al. |
| 2009/0138808 A1 | 5/2009 | Moromisato et al. |
| 2009/0150417 A1 | 6/2009 | Ghods et al. |
| 2009/0150627 A1 | 6/2009 | Benhase et al. |
| 2009/0158142 A1 | 6/2009 | Arthursson et al. |

(56) References Cited

U.S. PATENT DOCUMENTS

| | | |
|---|---|---|
| 2009/0164438 A1 | 6/2009 | Delacruz |
| 2009/0171983 A1 | 7/2009 | Samji et al. |
| 2009/0177754 A1* | 7/2009 | Brezina et al. ............... 709/206 |
| 2009/0193107 A1 | 7/2009 | Srinivasan et al. |
| 2009/0193345 A1 | 7/2009 | Wensley et al. |
| 2009/0198772 A1 | 8/2009 | Kim et al. |
| 2009/0210459 A1 | 8/2009 | Nair et al. |
| 2009/0214115 A1 | 8/2009 | Kimura et al. |
| 2009/0235167 A1 | 9/2009 | Boyer et al. |
| 2009/0235181 A1 | 9/2009 | Saliba et al. |
| 2009/0235189 A1 | 9/2009 | Aybes et al. |
| 2009/0249224 A1 | 10/2009 | Davis et al. |
| 2009/0254589 A1 | 10/2009 | Nair et al. |
| 2009/0260060 A1 | 10/2009 | Smith et al. |
| 2009/0265430 A1 | 10/2009 | Bechtel et al. |
| 2009/0271708 A1 | 10/2009 | Peters et al. |
| 2009/0276771 A1 | 11/2009 | Nickolov et al. |
| 2009/0282212 A1 | 11/2009 | Peterson |
| 2009/0282483 A1 | 11/2009 | Bennett |
| 2009/0300356 A1 | 12/2009 | Crandell |
| 2009/0300527 A1 | 12/2009 | Malcolm et al. |
| 2009/0327358 A1 | 12/2009 | Lukiyanov et al. |
| 2009/0327405 A1 | 12/2009 | Fitzgerald et al. |
| 2009/0327961 A1 | 12/2009 | De Vorchik et al. |
| 2010/0005087 A1 | 1/2010 | Basco et al. |
| 2010/0011292 A1 | 1/2010 | Marinkovich et al. |
| 2010/0011447 A1 | 1/2010 | Jothimani |
| 2010/0017262 A1 | 1/2010 | Iyer et al. |
| 2010/0017619 A1 | 1/2010 | Errico |
| 2010/0036929 A1 | 2/2010 | Scherpa et al. |
| 2010/0042720 A1 | 2/2010 | Stienhans et al. |
| 2010/0057560 A1 | 3/2010 | Skudlark et al. |
| 2010/0057785 A1 | 3/2010 | Khosravy et al. |
| 2010/0076946 A1 | 3/2010 | Barker et al. |
| 2010/0082634 A1 | 4/2010 | Leban |
| 2010/0083136 A1 | 4/2010 | Komine et al. |
| 2010/0088150 A1 | 4/2010 | Mazhar et al. |
| 2010/0092126 A1 | 4/2010 | Kaliszek et al. |
| 2010/0093310 A1 | 4/2010 | Gbadegesin et al. |
| 2010/0107225 A1 | 4/2010 | Spencer et al. |
| 2010/0131868 A1 | 5/2010 | Chawla et al. |
| 2010/0146009 A1* | 6/2010 | Kandekar ......... G06F 17/30746 707/803 |
| 2010/0151431 A1 | 6/2010 | Miller |
| 2010/0153835 A1 | 6/2010 | Xiong et al. |
| 2010/0162135 A1 | 6/2010 | Wanas et al. |
| 2010/0162365 A1 | 6/2010 | Del Real |
| 2010/0162374 A1 | 6/2010 | Nair |
| 2010/0179940 A1 | 7/2010 | Gilder et al. |
| 2010/0185932 A1 | 7/2010 | Coffman et al. |
| 2010/0191689 A1 | 7/2010 | Cortes et al. |
| 2010/0198783 A1 | 8/2010 | Wang et al. |
| 2010/0198871 A1 | 8/2010 | Stiegler et al. |
| 2010/0198944 A1 | 8/2010 | Ho et al. |
| 2010/0205537 A1 | 8/2010 | Knighton et al. |
| 2010/0218237 A1 | 8/2010 | Ferris et al. |
| 2010/0223378 A1 | 9/2010 | Wei |
| 2010/0228693 A1* | 9/2010 | Dawson ............... G06F 17/2705 706/12 |
| 2010/0229085 A1 | 9/2010 | Nelson et al. |
| 2010/0235526 A1 | 9/2010 | Carter et al. |
| 2010/0235539 A1 | 9/2010 | Carter et al. |
| 2010/0241611 A1 | 9/2010 | Zuber |
| 2010/0241972 A1 | 9/2010 | Spataro et al. |
| 2010/0250120 A1 | 9/2010 | Waupotitsch et al. |
| 2010/0251340 A1 | 9/2010 | Martin et al. |
| 2010/0257457 A1 | 10/2010 | De Goes |
| 2010/0262582 A1 | 10/2010 | Garcia-Ascanio et al. |
| 2010/0267588 A1 | 10/2010 | Nelson et al. |
| 2010/0274765 A1 | 10/2010 | Murphy et al. |
| 2010/0281118 A1 | 11/2010 | Donahue et al. |
| 2010/0290623 A1 | 11/2010 | Banks et al. |
| 2010/0306379 A1 | 12/2010 | Ferris |
| 2010/0312615 A1 | 12/2010 | Murphy et al. |
| 2010/0322252 A1 | 12/2010 | Suganthi et al. |
| 2010/0325155 A1 | 12/2010 | Skinner et al. |
| 2010/0325527 A1 | 12/2010 | Estrada et al. |
| 2010/0325559 A1 | 12/2010 | Westerinen et al. |
| 2010/0325655 A1 | 12/2010 | Perez |
| 2010/0332401 A1 | 12/2010 | Prahlad et al. |
| 2010/0332962 A1 | 12/2010 | Hammer et al. |
| 2010/0333116 A1 | 12/2010 | Prahlad et al. |
| 2010/1318893 | 12/2010 | Matthews et al. |
| 2011/0001763 A1 | 1/2011 | Murakami |
| 2011/0016409 A1 | 1/2011 | Grosz et al. |
| 2011/0022559 A1 | 1/2011 | Andersen et al. |
| 2011/0022812 A1 | 1/2011 | van der Linden et al. |
| 2011/0029883 A1 | 2/2011 | Lussier et al. |
| 2011/0040812 A1 | 2/2011 | Phillips |
| 2011/0041083 A1 | 2/2011 | Gabai et al. |
| 2011/0043652 A1* | 2/2011 | King ............... G06F 17/2288 348/222.1 |
| 2011/0047413 A1 | 2/2011 | McGill et al. |
| 2011/0047484 A1 | 2/2011 | Mount et al. |
| 2011/0052155 A1 | 3/2011 | Desmarais et al. |
| 2011/0054968 A1 | 3/2011 | Galaviz |
| 2011/0055299 A1 | 3/2011 | Phillips |
| 2011/0055721 A1 | 3/2011 | Jain et al. |
| 2011/0061045 A1 | 3/2011 | Phillips |
| 2011/0061046 A1 | 3/2011 | Phillips |
| 2011/0065082 A1 | 3/2011 | Gal et al. |
| 2011/0066645 A1* | 3/2011 | Cooper ............. G06F 17/30616 707/770 |
| 2011/0066951 A1 | 3/2011 | Ward-Karet et al. |
| 2011/0083167 A1 | 4/2011 | Carpenter et al. |
| 2011/0093567 A1 | 4/2011 | Jeon et al. |
| 2011/0099006 A1 | 4/2011 | Sundararaman et al. |
| 2011/0107088 A1 | 5/2011 | Eng et al. |
| 2011/0107205 A1 | 5/2011 | Chow et al. |
| 2011/0113011 A1* | 5/2011 | Prorock ................ G11B 27/36 707/634 |
| 2011/0113320 A1 | 5/2011 | Neff et al. |
| 2011/0119313 A1 | 5/2011 | Sung et al. |
| 2011/0125847 A1* | 5/2011 | Cocheu et al. ............... 709/204 |
| 2011/0131299 A1* | 6/2011 | Sardary ................ G11B 27/034 709/219 |
| 2011/0137991 A1 | 6/2011 | Russell |
| 2011/0142410 A1 | 6/2011 | Ishii |
| 2011/0145282 A1 | 6/2011 | Moore et al. |
| 2011/0145589 A1 | 6/2011 | Camenisch et al. |
| 2011/0145744 A1 | 6/2011 | Haynes et al. |
| 2011/0153330 A1* | 6/2011 | Yazdani ................ G10L 13/00 704/260 |
| 2011/0154180 A1 | 6/2011 | Evanitsky et al. |
| 2011/0161289 A1 | 6/2011 | Pei et al. |
| 2011/0167125 A1 | 7/2011 | Achlioptas |
| 2011/0167353 A1 | 7/2011 | Grosz et al. |
| 2011/0167435 A1 | 7/2011 | Fang |
| 2011/0185292 A1 | 7/2011 | Chawla et al. |
| 2011/0202461 A1 | 8/2011 | Chun et al. |
| 2011/0202599 A1* | 8/2011 | Yuan et al. .................... 709/203 |
| 2011/0208958 A1 | 8/2011 | Stuedi et al. |
| 2011/0209064 A1 | 8/2011 | Jorgensen et al. |
| 2011/0212430 A1* | 9/2011 | Smithmier ............... G09B 5/06 434/322 |
| 2011/0213765 A1 | 9/2011 | Cui et al. |
| 2011/0219419 A1 | 9/2011 | Reisman |
| 2011/0225417 A1 | 9/2011 | Maharajh et al. |
| 2011/0238458 A1 | 9/2011 | Purcell et al. |
| 2011/0238621 A1 | 9/2011 | Agrawal |
| 2011/0238759 A1 | 9/2011 | Spataro et al. |
| 2011/0239135 A1 | 9/2011 | Spataro et al. |
| 2011/0246294 A1 | 10/2011 | Robb et al. |
| 2011/0246950 A1 | 10/2011 | Luna et al. |
| 2011/0252071 A1 | 10/2011 | Cidon |
| 2011/0252320 A1 | 10/2011 | Arrasvuori et al. |
| 2011/0252339 A1 | 10/2011 | Lemonik et al. |
| 2011/0258200 A1 | 10/2011 | Drummond |
| 2011/0258461 A1 | 10/2011 | Bates |
| 2011/0258561 A1 | 10/2011 | Ladouceur et al. |
| 2011/0277027 A1 | 11/2011 | Hayton et al. |
| 2011/0282710 A1 | 11/2011 | Akkiraju et al. |
| 2011/0289433 A1 | 11/2011 | Whalin et al. |
| 2011/0296022 A1 | 12/2011 | Ferris et al. |

(56) References Cited

U.S. PATENT DOCUMENTS

| | | | |
|---|---|---|---|
| 2011/0313803 A1 | 12/2011 | Friend et al. | |
| 2011/0314485 A1* | 12/2011 | Abed | H04N 21/2353 725/14 |
| 2011/0320197 A1* | 12/2011 | Conejero | G06F 17/3002 704/235 |
| 2011/0320423 A1 | 12/2011 | Gemmell et al. | |
| 2012/0036370 A1 | 2/2012 | Lim et al. | |
| 2012/0056901 A1* | 3/2012 | Sankarasubramaniam | G06F 3/005 345/660 |
| 2012/0057696 A1 | 3/2012 | Chew | |
| 2012/0064879 A1 | 3/2012 | Panei | |
| 2012/0069131 A1* | 3/2012 | Abelow | G06Q 10/067 348/14.01 |
| 2012/0072436 A1 | 3/2012 | Pierre et al. | |
| 2012/0078626 A1* | 3/2012 | Tsai | G10L 15/26 704/235 |
| 2012/0078691 A1* | 3/2012 | Tsai | G06Q 30/0241 705/14.4 |
| 2012/0078712 A1* | 3/2012 | Fontana | H04N 5/76 705/14.49 |
| 2012/0079095 A1 | 3/2012 | Evans et al. | |
| 2012/0089659 A1 | 4/2012 | Halevi et al. | |
| 2012/0092055 A1 | 4/2012 | Peschke et al. | |
| 2012/0096521 A1 | 4/2012 | Peddada | |
| 2012/0110005 A1 | 5/2012 | Kuo et al. | |
| 2012/0110436 A1 | 5/2012 | Adler, III et al. | |
| 2012/0110443 A1 | 5/2012 | Lemonik et al. | |
| 2012/0117626 A1 | 5/2012 | Yates et al. | |
| 2012/0124306 A1 | 5/2012 | Abercrombie et al. | |
| 2012/0124547 A1 | 5/2012 | Halbedel | |
| 2012/0130900 A1 | 5/2012 | Tang et al. | |
| 2012/0131009 A1 | 5/2012 | Nath et al. | |
| 2012/0134491 A1 | 5/2012 | Liu | |
| 2012/0136936 A1 | 5/2012 | Quintuna | |
| 2012/0143605 A1* | 6/2012 | Thorsen | G10L 15/183 704/235 |
| 2012/0144283 A1 | 6/2012 | Hill et al. | |
| 2012/0150888 A1 | 6/2012 | Hyatt et al. | |
| 2012/0151551 A1 | 6/2012 | Readshaw et al. | |
| 2012/0158908 A1 | 6/2012 | Luna et al. | |
| 2012/0159178 A1 | 6/2012 | Lin et al. | |
| 2012/0159310 A1 | 6/2012 | Chang et al. | |
| 2012/0159341 A1 | 6/2012 | Murillo et al. | |
| 2012/0166516 A1 | 6/2012 | Simmons et al. | |
| 2012/0173612 A1 | 7/2012 | Vegesna-Venkata et al. | |
| 2012/0173625 A1 | 7/2012 | Berger | |
| 2012/0173626 A1 | 7/2012 | Reis et al. | |
| 2012/0179981 A1 | 7/2012 | Whalin et al. | |
| 2012/0185355 A1 | 7/2012 | Kilroy | |
| 2012/0185913 A1 | 7/2012 | Martinez et al. | |
| 2012/0192086 A1 | 7/2012 | Ghods et al. | |
| 2012/0203670 A1* | 8/2012 | Piersol | 705/27.1 |
| 2012/0203908 A1 | 8/2012 | Beaty et al. | |
| 2012/0204032 A1 | 8/2012 | Wilkins et al. | |
| 2012/0214444 A1 | 8/2012 | McBride et al. | |
| 2012/0218885 A1 | 8/2012 | Abel et al. | |
| 2012/0221789 A1 | 8/2012 | Felter | |
| 2012/0224691 A1 | 9/2012 | Purohit | |
| 2012/0226767 A1 | 9/2012 | Luna et al. | |
| 2012/0233155 A1 | 9/2012 | Gallmeier et al. | |
| 2012/0233205 A1 | 9/2012 | McDermott | |
| 2012/0233543 A1 | 9/2012 | Vagell et al. | |
| 2012/0240061 A1 | 9/2012 | Hillenius et al. | |
| 2012/0240183 A1 | 9/2012 | Sinha | |
| 2012/0257249 A1 | 10/2012 | Natarajan | |
| 2012/0259964 A1 | 10/2012 | Lin et al. | |
| 2012/0263166 A1 | 10/2012 | Cho et al. | |
| 2012/0266203 A1 | 10/2012 | Elhadad et al. | |
| 2012/0278388 A1* | 11/2012 | Kleinbart | G06Q 10/10 709/204 |
| 2012/0284290 A1* | 11/2012 | Keebler et al. | 707/756 |
| 2012/0284664 A1 | 11/2012 | Zhao | |
| 2012/0290591 A1* | 11/2012 | Flynn | G06F 17/30247 707/754 |
| 2012/0291011 A1 | 11/2012 | Quine | |
| 2012/0296790 A1 | 11/2012 | Robb | |
| 2012/0309540 A1 | 12/2012 | Holme et al. | |
| 2012/0311157 A1 | 12/2012 | Erickson et al. | |
| 2012/0317239 A1 | 12/2012 | Mulder et al. | |
| 2012/0317487 A1 | 12/2012 | Lieb et al. | |
| 2012/0328259 A1 | 12/2012 | Seibert, Jr. et al. | |
| 2012/0331177 A1 | 12/2012 | Jensen | |
| 2012/0331441 A1 | 12/2012 | Adamson | |
| 2013/0007245 A1 | 1/2013 | Malik et al. | |
| 2013/0007471 A1 | 1/2013 | Grab et al. | |
| 2013/0007894 A1 | 1/2013 | Dang et al. | |
| 2013/0013560 A1 | 1/2013 | Goldberg et al. | |
| 2013/0014023 A1 | 1/2013 | Lee et al. | |
| 2013/0042106 A1 | 2/2013 | Persaud et al. | |
| 2013/0055127 A1 | 2/2013 | Saito et al. | |
| 2013/0067232 A1 | 3/2013 | Cheung et al. | |
| 2013/0067333 A1* | 3/2013 | Brenneman | G11B 27/105 715/721 |
| 2013/0073403 A1 | 3/2013 | Tuchman et al. | |
| 2013/0080919 A1 | 3/2013 | Kiang et al. | |
| 2013/0110565 A1* | 5/2013 | Means, Jr. | G06Q 10/06 705/7.11 |
| 2013/0110804 A1 | 5/2013 | Davis et al. | |
| 2013/0117337 A1 | 5/2013 | Dunham | |
| 2013/0117376 A1 | 5/2013 | Filman et al. | |
| 2013/0124638 A1 | 5/2013 | Barreto et al. | |
| 2013/0124984 A1* | 5/2013 | Kuspa | H04N 9/475 715/255 |
| 2013/0138608 A1 | 5/2013 | Smith | |
| 2013/0138615 A1 | 5/2013 | Gupta et al. | |
| 2013/0151611 A1 | 6/2013 | Graham et al. | |
| 2013/0159411 A1 | 6/2013 | Bowen | |
| 2013/0163289 A1 | 6/2013 | Kim et al. | |
| 2013/0167253 A1 | 6/2013 | Seleznev et al. | |
| 2013/0185347 A1 | 7/2013 | Romano | |
| 2013/0185558 A1 | 7/2013 | Seibert et al. | |
| 2013/0191339 A1 | 7/2013 | Haden et al. | |
| 2013/0198600 A1 | 8/2013 | Lockhart et al. | |
| 2013/0212067 A1 | 8/2013 | Piasecki et al. | |
| 2013/0212486 A1 | 8/2013 | Joshi et al. | |
| 2013/0218978 A1 | 8/2013 | Weinstein et al. | |
| 2013/0232149 A1* | 9/2013 | Smith | G06F 17/30893 707/740 |
| 2013/0239049 A1 | 9/2013 | Perrodin et al. | |
| 2013/0246901 A1 | 9/2013 | Massand | |
| 2013/0246932 A1 | 9/2013 | Zaveri et al. | |
| 2013/0262210 A1 | 10/2013 | Savage et al. | |
| 2013/0262862 A1 | 10/2013 | Hartley | |
| 2013/0268480 A1 | 10/2013 | Dorman | |
| 2013/0268490 A1* | 10/2013 | Keebler | G06F 16/954 707/627 |
| 2013/0268491 A1 | 10/2013 | Chung et al. | |
| 2013/0275398 A1 | 10/2013 | Dorman et al. | |
| 2013/0275413 A1 | 10/2013 | Snir et al. | |
| 2013/0275429 A1* | 10/2013 | York | G06F 17/30029 707/737 |
| 2013/0275509 A1 | 10/2013 | Micucci et al. | |
| 2013/0282813 A1 | 10/2013 | Lessin et al. | |
| 2013/0282830 A1 | 10/2013 | Besen et al. | |
| 2013/0304774 A1 | 11/2013 | Tan et al. | |
| 2013/0305039 A1 | 11/2013 | Gauda | |
| 2013/0311481 A1* | 11/2013 | Bhatt | G06F 16/2228 707/741 |
| 2013/0326344 A1 | 12/2013 | Masselle et al. | |
| 2014/0007205 A1 | 1/2014 | Oikonomou | |
| 2014/0012836 A1 | 1/2014 | Bercovici | |
| 2014/0013112 A1 | 1/2014 | Cidon et al. | |
| 2014/0019497 A1 | 1/2014 | Cidon et al. | |
| 2014/0019498 A1 | 1/2014 | Cidon et al. | |
| 2014/0032489 A1 | 1/2014 | Hebbar et al. | |
| 2014/0032616 A1 | 1/2014 | Nack | |
| 2014/0033277 A1 | 1/2014 | Xiao et al. | |
| 2014/0033291 A1 | 1/2014 | Liu | |
| 2014/0039887 A1* | 2/2014 | Dzik | G10L 15/26 704/235 |

(56) References Cited

U.S. PATENT DOCUMENTS

| | | | |
|---|---|---|---|
| 2014/0052939 | A1 | 2/2014 | Tseng et al. |
| 2014/0059217 | A1 | 2/2014 | Pizurica |
| 2014/0068589 | A1 | 3/2014 | Barak |
| 2014/0074629 | A1* | 3/2014 | Rathod ............... 705/14.73 |
| 2014/0101094 | A1 | 4/2014 | Savage et al. |
| 2014/0115099 | A1* | 4/2014 | Kabir ............ H04L 12/1831 709/217 |
| 2014/0150023 | A1 | 5/2014 | Gudorf et al. |
| 2014/0156373 | A1 | 6/2014 | Roberts et al. |
| 2014/0164382 | A1* | 6/2014 | Keebler ......... G06F 17/30893 707/737 |
| 2014/0172595 | A1 | 6/2014 | Beddow et al. |
| 2014/0344456 | A1 | 11/2014 | Buzbee et al. |
| 2014/0359286 | A1 | 12/2014 | Wen et al. |
| 2015/0019723 | A1 | 1/2015 | Kweon et al. |

FOREIGN PATENT DOCUMENTS

| | | |
|---|---|---|
| CN | 102264063 A | 11/2011 |
| EP | 0348614 A2 | 1/1990 |
| EP | 0921661 A2 | 6/1999 |
| EP | 1349088 | 10/2003 |
| EP | 1528746 A2 | 5/2005 |
| EP | 1933242 A1 | 6/2008 |
| EP | 2372574 A1 | 10/2011 |
| EP | 2610776 A2 | 7/2013 |
| GB | 2453924 A | 4/2009 |
| GB | 2471282 A | 12/2010 |
| JP | 09-101937 | 4/1997 |
| JP | 11-025059 | 1/1999 |
| JP | 2003273912 A | 9/2003 |
| JP | 2004310272 A | 11/2004 |
| JP | 09-269925 | 10/2007 |
| JP | 2008250944 | 10/2008 |
| KR | 20020017444 A | 3/2002 |
| KR | 20040028036 | 4/2004 |
| KR | 20050017674 | 2/2005 |
| KR | 20060070306 A | 6/2006 |
| KR | 20060114871 A | 11/2006 |
| KR | 20070043353 A | 4/2007 |
| KR | 20070100477 A | 10/2007 |
| KR | 20100118836 A | 11/2010 |
| KR | 20110074096 A | 6/2011 |
| KR | 20110076831 A | 7/2011 |
| WO | WO-0007104 A1 | 2/2000 |
| WO | WO-2002019128 A1 | 3/2002 |
| WO | WO-2004097681 A1 | 11/2004 |
| WO | WO-2006028850 A2 | 3/2006 |
| WO | WO-2007024438 A1 | 3/2007 |
| WO | WO-2007035637 A2 | 3/2007 |
| WO | WO-2007113573 A2 | 10/2007 |
| WO | WO-2008011142 A2 | 1/2008 |
| WO | WO-2008076520 A2 | 6/2008 |
| WO | WO-2011109416 A2 | 9/2011 |
| WO | WO-2012167272 A1 | 12/2012 |
| WO | WO-2013009328 A2 | 1/2013 |
| WO | WO-2013013217 A1 | 1/2013 |
| WO | WO-2013041763 A1 | 3/2013 |
| WO | WO-2013166520 | 11/2013 |

OTHER PUBLICATIONS

Burns, "Developing Secure Mobile Applications for Android," Oct. 2008, Version 1.0, 1-28 pages.
Comes, "MediaXchange Users Manual," Version 1.15.15, Feb. 1, 2009, pp. 1-90.
Exam Report for GB1308842.2, Applicant: Box, Inc. dated Mar. 10, 2014, 4 pages.
Exam Report for GB1312264.3, Applicant: Box, Inc. dated Mar. 24, 2014, 7 pages.
Exam Report for GB1314771.5, Applicant: Box, Inc. dated Feb. 17, 2014, 7 pages.
John et al., "Always Sync Support Forums—View topic—Allway sync funny behavior," Allway Sync Support Forum at http://sync-center.com, Mar. 28, 2011, XP055109680, 2 pages.
Search Report for EP 11729851.3, Applicant: Box, Inc. dated Feb. 7, 2014, 9 pages.
Search Report for EP14151588.2, Applicant: Box, Inc. dated Apr. 15, 2014, 12 pages.
Search Report for EP14153783.7, Applicant: Box, Inc. dated Mar. 24, 2014, 7 pages.
"Microsoft Office SharePoint 2007 User Guide," Feb. 16, 2010, pp. 1-48.
International Search Report and Written Opinion for PCT/US2010/070366, Applicant: Box, Inc., dated Mar. 24, 2013, 10 pages.
Lars, "35 Very Useful Online Tools for Improving your project Management and Team Collaboration," Apr. 31, 2010, tripwiremagazine. com, pp. 1-32.
Parr, "Google Docs Improves Commenting, Adds E-mail Notifications," Apr. 16, 2011, mashable.com, pp. 1-6.
"How-to Geek, How to Sync Specific Folders With Dropbox," downloaded from the internet http://www.howtogeek.com, Apr. 23, 2013, 5 pages.
International Search Report and Written Opinion for PCT/US2013/020267, Applicant: Box, Inc., dated May 7, 2013, 10 pages.
Exam Report for GB1410569.6 Applicant: Box, Inc. dated Jul. 11, 2014, 9 pages.
Sommerer, "Presentable Document Format: Improved On-demand PDF to HTML Conversion," retrieved from the internet, http://research.microsoft.com, Nov. 2004, 8 pages.
Extended Search Report for EP131832800, Applicant: Box, Inc. dated Aug. 25, 2014, 7 pages.
Extended Search Report for EP141509422, Applicant: Box, Inc. dated Aug. 26, 2014, 12pages.
Search Report for Ep 13189144.2 Applicant: Box, Inc. dated Sep. 1, 2014, 9 pages.
Exam Report for GB1312874.9 Applicant: Box, Inc. dated Sep. 26, 2014, 2 pages.
Exam Report for GB1415126.0 Applicant: Box, Inc. dated Oct. 2, 2014, 8 pages.
Exam Report for GB1415314.2 Applicant: Box, Inc. dated Oct. 7, 2014, 6 pages.
Exam Report for GB1309209.3 Applicant: Box, Inc. dated Oct. 7, 2014, 3 pages.
Exam Report for GB1315232.7 Applicant: Box, Inc. dated Oct. 9, 2014, 5 pages.
Exam Report for GB1318789.3 Applicant: Box, Inc. dated Oct. 30, 2014, 6 pages.
Microsoft Windows XP Professional Product Documentation: How Inheritance Affects File and Folder Permissions, Apr. 11, 2014, 2 pages.
Exam Report for GB1317393.5 Applicant: Box, Inc. dated Nov. 7, 2014, 6 pages.
Exam Report for GB1311417.8 Applicant: Box, Inc. dated Nov. 7, 2014, 2 pages.
Exam Report for GB1311421.0 Applicant: Box, Inc. dated Nov. 7, 2014, 4 pages.
U.S. Appl. No. 60/992,656, filed Dec. 5, 2007 Methods and Systems for Open Source Collaboration in an Application Service Provider Environment.
U.S. Appl. No. 12/260,533 (U.S. Pat. No. 8,326,814) filed Oct. 29, 2008 (Dec. 4, 2012) Methods and Systems for Open Source Integration.
U.S. Appl. No. 13/412,549, filed Mar. 5, 2012 Methods and Systems for Open Source Collaboration in an Application Service Provider Environment.
U.S. Appl. No. 13/646,339, filed Oct. 5, 2012 File Management System and Collaboration Service and Integration Capabilities With Third Party Applications.
U.S. Appl. No. 13/274,268, filed Oct. 14, 2011 Automatic and Semi-Automatic Tagging Features of Work Items in a Shared Workspace for Metadata Tracking in a Cloud-Based Content Management System With Selective or Optional User Contribution.
U.S. Appl. No. 61/568,430, filed Dec. 8, 2011 Mobile Platform File and Folder Selection Functionalities for Offline Access and Synchronization.

(56) References Cited

OTHER PUBLICATIONS

U.S. Appl. No. 13/689,544, filed Nov. 29, 2012 Mobile Platform File and Folder Selection Functionalities for Offline Access and Synchronization.
U.S. Appl. No. 13/405,164, Feb. 24, 2012 System and Method for Promoting Enterprise Adoption of a Web-Based Collaboration Environment.
U.S. Appl. No. 13/890,172, filed May 8, 2013 Repository Redundancy Implementation of a System Which Incrementally Updates Clients With Events That Occurred via a Cloud-Enabled Platform.
U.S. Appl. No. 13/888,308, filed May 6, 2013 Repository Redundancy Implementation of a System Which Incrementally Updates Clients With Events That Occurred via a Cloud-Enabled Platform
U.S. Appl. No. 13/649,784, filed Oct. 11, 2012 Highly Available Ftp Servers for a Cloud-Based Service.
U.S. Appl. No. 13/969,474, filed Aug. 16, 2013 Client-Server Fast Upload and Download Feedback Optimizers.
U.S. Appl. No. 14/135,311, filed Dec. 19, 2013 Method and Apparatus for Synchronization of Items With Read-Only Permissions in a Cloud-Based Environment.
U.S. Appl. No. 14/027,149, filed Sep. 13, 2013 Simultaneous Editing/Accessing of Content by Collaborator Invitation Through a Web-Based or Mobile Application to a Cloud-Based Collaboration Platform.
International Search Report and Written Opinion for PCT/US2013/034662, Applicant: Box, Inc., dated May 31, 2013, 10 pages.
Exam Report for GB1306011.6, Applicant: Box, Inc. dated Apr. 18, 2013, 8 pages.
Exam Report for GB1300188.8, Applicant: Box, Inc. dated May 31, 2013, 8 pages.
"Conceptboard", One-Step Solution for Online Collaboration, retrieved from websites http://conceptboard.com and https://www.youtube.com/user/ConceptboardApp?feature=watch, printed on Jun. 13, 2013, 9 pages.
Exam Report for EP13158415.3, Applicant: Box, Inc. dated Jun. 4, 2013, 8 pages.
International Search Report and Written Opinion for PCT/US2013/029520, Applicant: Box, Inc., dated Jun. 26, 2013, 10 pages.
International Search Report and Written Opinion for PCT/US2013/023889, Applicant: Box, Inc., dated Jun. 24, 2013, 13 pages.
International Search Report and Written Opinion for PCT/US2013/035404, Applicant: Box, Inc., dated Jun. 26, 2013, 13 pages.
Exam Report for GB1316682.2 Applicant: Box, Inc. dated Nov. 19, 2014, 6 pages.
Exam Report for GB1312095.1 Applicant: Box, Inc. dated Nov. 19, 2014, 5 pages.
Exam Report for GB1313559.5 Applicant: Box, Inc. dated Nov. 4, 2014, 2 pages.
User's Guide for Smart Board Software for Windows, published Dec. 2004, 90 pages.
Zambonini et al., "Automated Measuring of Interaction with User Interfaces," Published as WO2007113573 Oct. 2007, 19 pages.
Exam Report for GB1309209.3 Applicant: Box, Inc. dated Jan. 19, 2015, 6 pages.
"Agilewords—How to Request Approval," YouTube, http://www.youtube.com/watch?v=3-Ov3DYNN3Q, Jan. 31, 2011, 2 pages.
"Agilewords—Features, Powerful Features Yet Simple," Jun. 1, 2011, http://web.archive.org/web/20110601223756/http://agilewords.com/product/features, 3 pages.
Conner, "Google Apps: The Missing Manual," published by O'Reilly Media, May 27, 2008, 42 pages.
Exam Report for EP 13177108.1, Applicant: Box, Inc. dated Feb. 17, 2015, 6 pages.
Exam Report for GB1312264.3 Applicant: Box, Inc. dated Jan. 30, 2015, 5 pages.
Exam Report for GB1312874.9 Applicant: Box, Inc. dated Feb. 10, 2015, 7 pages.
Exam Report for GB1316685.5 Applicant: Box, Inc. dated Feb. 17, 2015, 5 pages.

Exam Report for EP 13185269.1, Applicant: Box, Inc. dated Feb. 13, 2015, 8 pages.
"PaperPort Professional 14," PC Mag. Com review, published Feb. 2012, Ziff Davis, Inc., 8 pages.
"PaperPort," Wikipedia article (old revision), published May 19, 2012, Wikipedia Foundation, 2 pages.
"Quickoffice Enhances Android Mobile office Application for Improved Productivity on latest Smartphone and Table Devices," QuickOffice Press Release, Nov. 21, 2011, QuickOffice Inc., 2 pages.
"QuickOffice," Wikipedia Article (old revision), published May 9, 2012, Wikipedia Foundation, 2 pages.
Exam Report for EP13168784.0, Applicant: Box, Inc. dated Nov. 21, 2013, 7 pages.
Exam Report for GB1309209.3, Applicant: Box, Inc. dated Oct. 30, 2013, 11 pages.
Exam Report for GB1310666.1, Applicant: Box, Inc. dated Aug. 30, 2013, 10 pages.
Exam Report for GB1311417.8, Applicant: Box, Inc. dated Dec. 20, 2013, 5 pages.
Exam Report for GB1312095.1, Applicant: Box, Inc. dated Dec. 12, 2013, 7 pages.
Exam Report for GB1312874.9, Applicant: Box, Inc. dated Dec. 20, 2013, 11 pages.
Exam Report for GB1313559.5, Applicant: Box, Inc., dated Aug. 22, 2013, 19 pages.
Exam Report for GB1316532.9, Applicant: Box, Inc. dated Oct. 31, 2013, 10 pages.
Exam Report for GB1316533.7, Applicant: Box, Inc. dated Oct. 8, 2013, 9 pages.
Exam Report for GB1316971.9, Applicant: Box, Inc. dated Nov. 26, 2013, 10 pages.
Exam Report for GB1317600.3, Applicant: Box, Inc. dated Nov. 21, 2013, 8 pages.
Exam Report for GB1318373.6, Applicant: Box, Inc. dated Dec. 17, 2013, 4 pages.
Exam Report for GB1320902.8, Applicant: Box, Inc. dated Dec. 20, 2013, 4 pages.
Gedymin, "Cloud computing with an emphasis on Google App Engine," Master Final Project, Sep. 2011, 146 pages.
Google Docs, http://web.Archive.org/web/20100413105758/http://en.wikipedia.org/wiki/Google_docs, Apr. 13, 2010, 6 pages.
International Search Report and Written Opinion for PCT/US2013/034765, Applicant: Box, Inc., dated Jan. 20, 2014, 15 pages.
International Search Report and Written Opinion for PCT/US2013/039782, Applicant: Box, Inc., dated Aug. 28, 2013, 15 pages.
Patent Court Document of Approved Judgment for GB0602349.3 and GB0623571.7; Mar. 3, 2009, 17 pages.
Exam Report for EP13185269.1, Applicant: Box, Inc. dated Jan. 28, 7 pages.
"Understanding Metadata," National Information Standards Organization, NISO Press, 2004, 20 pages.
Cisco, "FTP Load Balancing on ACE in Routed Mode Configuration Example," DocWiki, Jun. 2011, 7 pages.
Conner, "Google Apps: The Missing Manual," published by O'Reilly Media, May 27, 2008, 24 pages.
International Search Report and Written Opinion for PCT/US2008/012973 dated Apr. 30, 2009, pp. 1-11.
International Search Report and Written Opinion for PCT/US2011/039126 dated Oct. 6, 2011, pp. 1-13.
International Search Report and Written Opinion for PCT/US2011/041308 dated Jul. 2, 2012, pp. 1-16.
International Search Report and Written Opinion for PCT/US2011/047530, Applicant: Box, Inc., dated Mar. 22, 2013, pp. 1-10.
International Search Report and Written Opinion for PCT/US2011/056472 dated Jun. 22, 2012, pp. 1-12.
International Search Report and Written Opinion for PCT/US2011/057938, Applicant: Box, Inc., dated Mar. 29, 2013, 10 pages.
International Search Report and Written Opinion for PCT/US2011/060875 dated Oct. 30, 2012, pp. 1-10.
International Search Report and Written Opinion for PCT/US2012/056955, Applicant: Box, Inc., dated Mar. 27, 2013, pp. 1-11.
International Search Report and Written Opinion for PCT/US2012/063041, Applicant: Box, Inc., dated Mar. 29, 2013, 12 pages.

(56) References Cited

OTHER PUBLICATIONS

International Search Report and Written Opinion for PCT/US2012/065617, Applicant: Box, Inc., dated Mar. 29, 2013, 9 pages.
International Search Report and Written Opinion for PCT/US2012/067126, Applicant: Box, Inc., dated Mar. 29, 2013, 10 pages.
Internet Forums, http://web.archive.org/web/20100528195550/http://en.wikipedia.org/wiki/Internet_forums, Wikipedia, May 30, 2010, pp. 1-20.
Langfeld L. et al., "Microsoft SharePoint 2003 Unleashed," Chapters 11 and 15, Jun. 2004, pp. 403-404, 557-561, 578-581.
Palmer, "Load Balancing FTP Servers," BlogNav, Oct. 2008, 2 pages.
Partial International Search Report for PCT/US2011/041308 dated Feb. 27, 2012, pp. 1-2.
Supplementary European Search Report European Application No. EP 08 85 8563 dated Jun. 20, 2011 pp. 1-5.
Wayback, "Wayback machine," Wayback, Jun. 1, 2011, 1 page.
Wiki, http://web.archive.org/web/20100213004936/http://en.wikipedia.org/wiki/Wiki, Feb. 13, 2010, pp. 1-16.
Yahoo! Groups, http://web.archive.org/web/20090320101529/http://en.wikipedia.org/wiki/Yahoo!_Groups, Wikipedia, Mar. 20, 2009, pp. 1-6.
Exam Report for GB1313559.5; Applicant: Box, Inc., dated Mar. 31, 2016, 6 pages.
Miller, "Cloud Computing Web-Based Applications That Change the Way you Work and Collaborate Online," 2009, 29 pages.
U.S. Appl. No. 13/829,663, filed Mar. 14, 2013 Cloud-Based Platform Enabled With Media Content Indexed for Text-Based Searches and/or Metadata Extraction.
U.S. Appl. No. 14/531,035, filed Jul. 3, 2014 System and Method for Advanced Search and Filtering Mechanisms for Enterprise Administrators in a Cloud-Based Environment.
Exam Report for GB1312095.1; Applicant: Box, Inc., dated Jun. 11, 2015, 9 pages.
U.S. Appl. No. 60/992,656, filed Dec. 5, 2007, filed Dec. 5, 2007 Methods and Systems for Open Source Collaboration in an Application Service Provider Environment.
U.S. Appl. No. 61/055,901, filed May 23, 2008 Methods and Systems for Open Source Integration.
U.S. Appl. No. 12/260,533 (U.S. Pat. No. 8,326,814) Oct. 29, 2008 (Dec. 4, 2012) Methods and Systems for Open Source Integration.
U.S. Appl. No. 13/030,090 (U.S. Pat. No. 8,140,513) filed Feb. 17, 2011 (Mar. 20, 2012) Methods and Systems for Open Source Collaboration in an Application Service Provider Environment.
U.S. Appl. No. 13/412,549 (U.S. Pat. No. 8,583,619) filed Mar. 5, 2012 (Nov. 12, 2013) Methods and Systems for Open Source Collaboration in an Application Service Provider Environment.
U.S. Appl. No. 13/646,339, filed Oct. 5, 2012 Filed Management System and Collaboration Service and Integration Capabilities With Third Party Applications.
U.S. Appl. No. 14/073,502, filed Nov. 6, 2013 Methods and Systems for Open Source Collaboration in an Application Service Provider Environment.
U.S. Appl. No. 61/434,810, filed Jan. 20, 2011 Real Time Notifications of Activity and Real-Time Collaboration in a Cloud-Based Environment With Applications in Enterprise Settings.
U.S. Appl. No. 13/152,982, filed Jun. 3, 2011 Real Time Notification of Activities that Occur in a Web-Based Collaboration Environment.
U.S. Appl. No. 13/166,733, filed Jun. 22, 2011 Multimedia Content Preview Rendering in a Cloud Content Management System.
U.S. Appl. No. 61/551,894, filed Oct. 26, 2011 Enhanced Multimedia Content Preview Rendering in a Cloud Content Management System.
U.S. Appl. No. 13/590,012, filed Aug. 20, 2012 Preview Pre-Generation Based on Heuristics and Algorithmic Prediction/Assessment of Predicted User Behavior for Enhancement of User Experience.
U.S. Appl. No. 13/297,230, filed Nov. 15, 2011 Enhanced Multimedia Content Preview Rendering in a Cloud Content Management.
U.S. Appl. No. 61/592,567, filed Jan. 30, 2012 Preview Pre-Generation Based on Heuristics and Algorithmic Prediction/Assessment of Predicted User Behavior for Enhancement of User Experience.
U.S. Appl. No. 61/506,013, filed Jul. 8, 2011 Collaboration Sessions in a Workspace on a Cloud-Based Content Management System.
U.S. Appl. No. 13/208,615, filed Aug. 12, 2011 Collaboration Sessions in a Workspace on a Cloud-Based Content Management System.
U.S. Appl. No. 61/592,394, filed Jan. 30, 2012 Extended Applications of Multimedia Content Previews in the Cloud-Based Content Management System.
U.S. Appl. No. 13/588,356, filed Aug. 17, 2012 Extended Applications of Multimedia Content Previews in the Cloud-Based Content Management System.
U.S. Appl. No. 13/274,268 (U.S. Pat. No. 8,515,902) filed Oct. 14, 2011 (Aug. 20, 2013) Automatic and Semi-Automatic Tagging Features of Work Items in a Shared Workspace for Metadata Tracking in a Cloud-Based Content Management System With Selective or Optional User Contribution.
U.S. Appl. No. 13/968,357, filed Aug. 15, 2013 Automatic and Semi-Automatic Tagging Features of Work Items in a Shared Workspace for Metadata Tracking in a Cloud-Based Content Management System With Selective or Optional User Contribution.
U.S. Appl. No. 61/538,782, filed Sep. 23, 2011 Central Management and Control of User-Contributed Content in a Web-Based Collaboration Environment and Management Console Thereof.
U.S. Appl. No. 13/547,264, filed Jul. 12, 2012 Central Management and Control of User-Contributed Content in a Web-Based Collaboration Environment and Management Console Thereof.
U.S. Appl. No. 13/165,725, filed Jun. 21, 2011 Batch Uploading of Content to a Web-Based Collaboration Environment.
U.S. Appl. No. 61/505,999, filed Jul. 11, 2011 Desktop Application for Access and Interaction with Workspaces in a Cloud-Based Content Management System and Synchronization Mechanisms Thereof.
U.S. Appl. No. 13/282,427, filed Oct. 26, 2011 Desktop Application for Access and Interaction with Workspaces in a Cloud-Based Content Management System and Synchronization Mechanisms Thereof.
U.S. Appl. No. 61/554,450, filed Nov. 1, 2011 Platform and Application Independent Method for Document Editing and Version Tracking via a Web Browser.
U.S. Appl. No. 13/332,319, filed Dec. 20, 2011 Platform and Application Independent System and Method for Networked File Access and Editing.
U.S. Appl. No. 13/414,480, filed Mar. 7, 2012 Universal File Type Preview For Mobile Devices.
U.S. Appl. No. 61/564,425, filed Nov. 29, 2011 Mobile Platform Folder Synchronization and Offline Synchronization.
U.S. Appl. No. 61/568,430, filed Dec. 8, 2011 Mobile Platform File and Folder Selection Functionalities for offline Access and Synchronization.
U.S. Appl. No. 13/689,544, filed Nov. 29, 2012 Mobile Platform File and Folder Selection Functionalities for offline Access and Synchronization.
U.S. Appl. No. 13/345,502, filed Jan. 6, 2012 System and Method for Actionable Event Generation for Task Delegation and Management via a Discussion Forum in a Web-Based Collaboration Environment.
U.S. Appl. No. 13/619,439, filed Sep. 14, 2012 Batching Notifications of Activities That Occur in a Web-Based Collaboration Environment.
U.S. Appl. No. 61/560,685, filed Nov. 16, 2011 Temporal and Spatial Processing and Tracking of Events in a Web-Based Collaboration Environment for Asynchronous Delivery in an Ordered Fashion.
U.S. Appl. No. 13/524,501, filed Jun. 15, 2012 Resource Effective Incremental Updating of a Remote Client With Events Which Occurred via a Cloud-Enabled Platform.
U.S. Appl. No. 13/526,437, filed Jun. 18, 2012 Managing Updates at Clients Used by a User to Access a Cloud-Based Collaboration Service.

(56) References Cited

OTHER PUBLICATIONS

U.S. Appl. No. 61/579,551, filed Dec. 22, 2011 System Status Monitoring and Data Health Checking in a Collaborative Environment.
U.S. Appl. No. 13/464,813, filed Apr. 4, 2012 Health Check Services for Web-Based Collaboration Environments.
U.S. Appl. No. 13/405,164, filed Feb. 24, 2012 System and Method for Promoting Enterprise Adoption of a Web-Based Collaboration Environment.
U.S. Appl. No. 13/431,645, filed Mar. 27, 2012 Cloud Service or Storage Use Promotion via Partnership Driven Automatic Account Upgrades.
U.S. Appl. No. 61/620,554, filed Apr. 5, 2012 Device Pinning Capability for Enterprise Cloud Service and Storage Accounts.
U.S. Appl. No. 13/493,922, filed Jun. 11, 2012 Device Pinning Capability for Enterprise Cloud Service and Storage Accounts.
U.S. Appl. No. 61/649,869, filed Mar. 21, 2012 Selective Application Access Control via a Cloud-Based Service for Security Enhancement.
U.S. Appl. No. 13/493,783, filed Jun. 11, 2012 Security Enhancement Through Application Access Control.
U.S. Appl. No. 61/702,948, filed Sep. 19, 2012 Cloud-Based Platform Enabled With Media Content Indexed for Text-Based Searches and/or Metadata Extraction.
U.S. Appl. No. 61/702,662, filed Sep. 18, 2012 Sandboxing Individual Applications to Specific User Folders in a Cloud-Based Service.
U.S. Appl. No. 13/830,016, filed Mar. 14, 2013 Sandboxing Individual Applications to Specific User Folders in a Cloud-Based Service.
U.S. Appl. No. 61/620,568, filed Apr. 5, 2012 Synchronization Client Selective Subfolder Syncing in a Cloud-Based Environment.
U.S. Appl. No. 13/856,607, filed Apr. 4, 2013 Method and Apparatus for Selective Subfolder Synchronization in a Cloud-Based Environment.
U.S. Appl. No. 61/622,868, filed Apr. 11, 2012 Web And Desktop Client Synchronization of Mac Packages With a Cloud-Based Platform.
U.S. Appl. No. 13/618,993, filed Sep. 14, 2012 Cloud Service Enabled to Handle a Set of Files Depicted to a User as a Single File in a Native Operating System.
U.S. Appl. No. 61/643,116, filed May 4, 2012 Hbase Redundancy Implementation for Action Log Framework.
U.S. Appl. No. 13/890,172, filed May 8, 2013 Repository Redundancy Implementation of a System Which Incrementally Updates Clients With Events That Occurred via a Cloud-Enabled Platform.
U.S. Appl. No. 13/888,308, filed May 6, 2013 Repository Redundancy Implementation of a System Which Incrementally Updates Clients With Events That Occurred via a Cloud-Enabled Platform.
U.S. Appl. No. 61/693,521, filed Aug. 27, 2012 Backend Implementation of Synchronization Client Selective Subfolder Syncing in a Cloud-Based Environment.
U.S. Appl. No. 14/010,851, filed Aug. 27, 2013 Server Side Techniques for Reducing Database Workload in Implementing Selective Subfolder Synchronization in a Cloud-Based Environment.
U.S. Appl. No. 61/641,824, filed May 2, 2012 Platform and Application Agnostic Method for Seamless File Access in a Mobile Environment.
U.S. Appl. No. 61/650,840, filed May 23, 2012 Platform and Application Agnostic Method for Seamless File Access in a Mobile Environment.
U.S. Appl. No. 61/653,876, filed May 31, 2012 Platform and Application Agnostic Method for Seamless File Access in a Mobile Environment.
U.S. Appl. No. 13/886,147, filed May 2, 2013 System and Method for a Third-Party Application to Access Content Within a Cloud-Based Platform.
U.S. Appl. No. 13/897,421, filed May 19, 2013 Methods, Architectures and Security Mechanisms for a Third-Party Application to Access Content in a Cloud-Based Platform.
U.S. Appl. No. 13/898,200, filed May 20, 2013 Metadata Enabled Third-Party Application Access of Content at a Cloud-Based Platform via a Native Client to The Cloud-Based Platform.
U.S. Appl. No. 13/898,242, filed May 20, 2013 Identification Verification Mechanisms for a Third-Party Application to Access Content in a Cloud-Based Platform.
U.S. Appl. No. 61/667,909, filed Jul. 3, 2012 Highly Available Ftp Servers for a Cloud-Based Service.
U.S. Appl. No. 13/565,136, filed Aug. 2, 2012 Load Balancing Secure Ftp Connections Among Multiple Ftp Servers.
U.S. Appl. No. 13/649,784 (U.S. Pat. No. 8,179,445) filed Oct. 11, 2012 (May 6, 2014) Highly Available Ftp Servers for a Cloud-Based Service.
U.S. Appl. No. 61/668,626, filed Jul. 6, 2012 Online Shard Migration.
U.S. Appl. No. 13/937,060, filed Jul. 8, 2013 System and Method for Performing Shard Migration to Support Functions of a Cloud-Based Service.
U.S. Appl. No. 61/668,698, filed Jul. 6, 2012 Identification of People as Search Results From Key-Word Based Searches of Content.
U.S. Appl. No. 13/937,101, filed Jul. 8, 2013 Identification of People as Search Results From Key-Word Based Searches of Content in a Cloud-Based Environment.
U.S. Appl. No. 61/668,791, filed Jul. 6, 2012 Systems and Methods for Specifying User and Item Identifiers Within an Email Address for Securely Submitting Comments via Email.
U.S. Appl. No. 13/937,124, filed Jul. 8, 2013 Systems and Methods for Securely Submitting Comments Among Users via External Messaging Applications in a Cloud-Based Platform.
U.S. Appl. No. 61/673,671, filed Jul. 19, 2012 Data Loss Prevention Methods and Architectures in a Cloud Service.
U.S. Appl. No. 13/944,184, filed Jul. 17, 2013 Data Loss Prevention (Dlp) Methods And Architectures by a Cloud Service.
U.S. Appl. No. 13/944,241, filed Jul. 17, 2013 Data Loss Prevention (Dlp) Methods by a Cloud Service Including Third Party Integration Architectures.
U.S. Appl. No. 61/694,492, filed Aug. 29, 2012 Method of Streaming File Encryption and Decryption to/From a Collaborative Cloud.
U.S. Appl. No. 13/975,827, filed Aug. 26, 2013 Method of Streaming File Encryption and Decryption to/From a Collaborative Cloud.
U.S. Appl. No. 61/701,823, filed Sep. 17, 2012 Use of a Status Bar Interface Element as a Handle for Revealing Additional Details.
U.S. Appl. No. 13/737,577, filed Jan. 9, 2013 System and Method of a Manipulative Handle in an Interactive Mobile User Interface.
U.S. Appl. No. 61/697,437, filed Sep. 6, 2012 Secure File Portability Between Mobile Applications Using a Server-Based Key Generation Service.
U.S. Appl. No. 13/776,358, filed Feb. 25, 2013 Secure File Portability Between Mobile Applications Using a Server-Based Key Generation Service.
U.S. Appl. No. 61/697,469, filed Sep. 6, 2012 Force Upgrade of a Mobile Application via Server Side Configuration Files.
U.S. Appl. No. 13/776,467, filed Feb. 25, 2013 Force Upgrade of a Mobile Application via Server Side Configuration File.
U.S. Appl. No. 61/697,477, filed Sep. 6, 2012 Disabling The Self-Referential Appearance of a Mobile Application in an Intent via a Background Registration.
U.S. Appl. No. 13/794,401, filed Mar. 11, 2013 Disabling The Self-Referential Appearance of a Mobile Application in an Intent via a Background Registration.
U.S. Appl. No. 61/697,511, filed Sep. 6, 2012 Channel for Opening and Editing Files From a Cloud Service Provider Based on Intents.
U.S. Appl. No. 13/776,535, filed Feb. 25, 2013 System and Method for Creating a Secure Channel for Inter-Application Communication Based on Intents.
U.S. Appl. No. 61/694,466, filed Aug. 12, 2012 Optimizations for Client and/or Server Feedback Information Enabled Real Time or Near Real Time Enhancement of Upload/Download Performance.
U.S. Appl. No. 61/702,154, filed Sep. 17, 2012 Optimizations for Client and/or Server Feedback Information Enabled Real Time or Near Real Time Enhancement of Upload/Download Performance.

(56) References Cited

OTHER PUBLICATIONS

U.S. Appl. No. 61/703,699, filed Sep. 20, 2012 Optimizations for Client and/or Server Feedback Information Enabled Real Time or Near Real Time Enhancement of Upload/Download Performance.
U.S. Appl. No. 13/969,474 (U.S. Pat. No. 8,745,267) filed Aug. 16, 2013 (Jun. 3, 2014) Client-Server Fast Upload and Download Feedback Optimizers.
U.S. Appl. No. 14/293,685, filed Jun. 2, 2014 Enhancement of Upload and/or Download Performance Based on Client and/or Server Feedback Information.
U.S. Appl. No. 61/751,578, filed Jan. 11, 2013 Functionalities, Features, and User Interface of a Synchronization Client to a Cloud-Based Environment.
U.S. Appl. No. 14/153,726, filed Jan. 13, 2014 Functionalities, Features, and User Interface of a Synchronization Client to a Cloud-Based Environment.
U.S. Appl. No. 61/715,208, filed Oct. 17, 2012 Adaptive Architectures for Encryption Key Management in a Cloud-Based Environment.
U.S. Appl. No. 14/056,899, filed Oct. 17, 2013 Remote Key Management in a Cloud-Based Environment.
U.S. Appl. No. 61/709,086, filed Oct. 2, 2012 Visibility, Access Control, Advanced Reporting Api, and Enhanced Data Protection and Security Mechanisms for Administrators in an Enterprise.
U.S. Appl. No. 14/044,261, filed Oct. 2, 2013 System and Method for Enhanced Security and Management Mechanisms for Enterprise Administrators in a Cloud-Based Environment.
U.S. Appl. No. 61/709,653, filed Oct. 4, 2012 Corporate User Discovery and Identification of Recommended Collaborators in a Cloud Platform.
U.S. Appl. No. 14/046,294, filed Oct. 4, 2013 Corporate User Discovery and Identification of Recommended Collaborators in a Cloud Platform.
U.S. Appl. No. 61/709,866, filed Oct. 4, 2012 Enhanced Quick Search Features, Low-Barrier Commenting/Interactive Features in a Collaboration Platform.
U.S. Appl. No. 14/046,523, filed Oct. 4, 2013 Enhanced Quick Search Features, Low-Barrier Commenting/Interactive Features in a Collaboration Platform.
U.S. Appl. No. 61/709,407, filed Oct. 4, 2012 Seamless Access, Editing, and Creation of Files in a Web Interface or Mobile Interface to a Cloud Platform.
U.S. Appl. No. 14/046,726, filed Oct. 4, 2013 Seamless Access, Editing, and Creation of Files in a Web Interface or Mobile Interface to a Collaborative Cloud Platform.
U.S. Appl. No. 61/710,182, filed Oct. 5, 2012 Embedded Html Folder Widget for Accessing a Cloud Collaboration Platform and Content From Any Site.
U.S. Appl. No. 14/047,223, filed Oct. 7, 2013 System and Method for Generating Embeddable Widgets Which Enable Access to a Cloud-Based Collaboration Platform.
U.S. Appl. No. 61/750,474, filed Jan. 9, 2013 File System Event Monitor and Event Filter Pipeline for a Cloud-Based Platform.
U.S. Appl. No. 14/149,586, filed Jan. 7, 2014 File System Monitoring in a System Which Incrementally Updates Clients With Events That Occurred in a Cloud-Based Collaboration Platform.
U.S. Appl. No. 61/753,761 Conflict Resolution, Retry Condition Management, and Handling of Problem Files for the Synchronization Client to a Cloud-Based Platform.
U.S. Appl. No. 14/158,626 Conflict Resolution, Retry Condition Management, and Handling of Problem Files for the Synchronization Client to a Cloud-Based Platform.
U.S. Appl. No. 61/739,296, filed Dec. 19, 2012 Synchronization of Read-Only Files/Folders by a Synchronization Client With a Cloud-Based Platform.
U.S. Appl. No. 14/135,311, filed Dec. 19, 2013 Method and Apparatus for Synchronization of Items With Read-Only Permissions in a Cloud-Based Environment.
U.S. Appl. No. 61/748,399, filed Jan. 2, 2013 Handling Action Log Framework Race Conditions for a Synchronization Client to a Cloud-Based Environment.
U.S. Appl. No. 14/146,658, filed Jan. 2, 2014 Race Condition Handling in a System Which Incrementally Updates Clients With Events That Occurred in a Cloud-Based Collaboration Platform.
U.S. Appl. No. 61/822,170, filed May 10, 2013 Identification and Handling of Items to be Ignored for Synchronization With a Cloud-Based Platform by a Synchronization Client.
U.S. Appl. No. 14/275,890, May 13, 2014 Identification and Handling of Items to be Ignored for Synchronization With a Cloud-Based Platform by a Synchronization Client.
U.S. Appl. No. 61/822,191, filed May 10, 2013 Systems and Methods for Depicting Item Synchronization With a Cloud-Based Platform by a Synchronization Client.
U.S. Appl. No. 14/275,401, filed May 12, 2014 Top Down Delete or Unsynchronization on Delete of and Depiction of Item Synchronization With a Synchronization Client to a Cloud-Based Platform.
U.S. Appl. No. 61/834,756, filed Jun. 13, 2013 Systems and Methods for Event Building, Collapsing, or Monitoring by a Synchronization Client of a Cloud-Based Platform.
U.S. Appl. No. 14/304,038, filed Jun. 13, 2014 Systems and Methods for Synchronization Event Building and/or Collapsing by a Synchronization Component of a Cloud-Based Platform.
U.S. Appl. No. 61/838,176, filed Jun. 21, 2013 Maintaining and Updating File System Shadows on a Local Device by a Synchronization Client of a Cloud-Based Platform.
U.S. Appl. No. 14/312,482, filed Jun. 23, 2014 Maintaining and Updating File System Shadows on a Local Device by a Synchronization Client of a Cloud-Based Platform.
U.S. Appl. No. 61/839,325, filed Jun. 23, 2013 Systems and Methods for Improving Performance of a Cloud-Based Platform.
U.S. Appl. No. 14/314,887, filed Jun. 25, 2014 Systems and Methods for Managing Upgrades, Migration of User Data and Improving Performance of a Cloud-Based Platform.
U.S. Appl. No. 61/839,331, filed Jun. 25, 2013 Systems and Methods for Providing Shell Communication in a Cloud-Based Platform.
U.S. Appl. No. 14/314,677, filed Jun. 25, 2014 Systems and Methods for Providing Shell Communication in a Cloud-Based Platform.
U.S. Appl. No. 13/954,680, filed Jul. 30, 2013 System and Method for Advanced Control Tools for Administrators in a Cloud-Based Service.
U.S. Appl. No. 61/860,050, filed Jul. 30, 2013 Scalability Improvement in a System Which Incrementally Updates Clients With Events That Occurred in a Cloud-Based Collaboration Platform.
U.S. Appl. No. 14/194,091, filed Feb. 28, 2014 Scalability Improvement in a System Which Incrementally Updates Clients With Events That Occurred in a Cloud-Based Collaboration Platform.
U.S. Appl. No. 13/953,668, filed Jul. 29, 2013 System and Method for Advanced Search and Filtering Mechanisms for Enterprise Administrators in a Cloud-Based Environment.
U.S. Appl. No. 14/026,674, filed Sep. 13, 2013 Configurable Event-Based Automation Architecture for Cloud-Based Collaboration Platforms.
U.S. Appl. No. 61/877,917, filed Sep. 13, 2013 Systems and Methods for Configuring Event-Based Automation in Cloud-Based Collaboration Platforms.
U.S. Appl. No. 14/075,849, filed Nov. 8, 2013 Systems and Methods for Configuring Event-Based Automation in Cloud-Based Collaboration Platforms.
U.S. Appl. No. 14/027,149, filed Sep. 13, 2003, 61599.8095.US1 Simultaneous Editing/Accessing of Content by Collaborator Invitation Through a Web-Based or Mobile Application to a Cloud-Based Collaboration Platform.
U.S. Appl. No. 14/042,473, filed Sep. 30, 2013 Simultaneous Editing/Accessing of Content by Collaborator Invitation Through a Web-Based or Mobile Application to a Cloud-Based Collaboration Platform.
U.S. Appl. No. 14/026,837, filed Sep. 13, 2013 Mobile Device, Methods and User Interfaces Thereof in a Mobile Device Platform

(56) References Cited

OTHER PUBLICATIONS

Featuring Multifunctional Access And Engagement in a Collaborative Environment Provided by a Cloud-Based Platform.
U.S. Appl. No. 14/166,414, filed Jan. 28, 2014 System and Method of a Multi-Functional Managing User Interface for Accessing a Cloud-Based Platform via Mobile Devices.
U.S. Appl. No. 14/027,147, filed Sep. 13, 2013 System and Method for Rendering Document in Web Browser or Mobile Device Regardless of Third-Party Plug-In Software.
U.S. Appl. No. 61/877,938, filed Sep. 13, 2013 High Availability Architecture for a Cloud-Based Concurrent-Access Collaboration Platform.
U.S. Appl. No. 14/474,507, filed Sep. 2, 2014 High Availability Architecture for a Cloud-Based Concurrent-Access Collaboration Platform.
U.S. Appl. No. 61/894,340, filed Oct. 22, 2013 Desktop Application for Accessing a Cloud Collaboration Platform.
U.S. Appl. No. 14/521,134, filed Oct. 22, 2014 Desktop Application for Accessing a Cloud Collaboration Platform
U.S. Appl. No. 14/472,540, filed Aug. 29, 2014 Enhanced Remote Key Management for an Enterprise in a Cloud-Based Environment.
U.S. Appl. No. 14/474,008, filed Aug. 28, 2014 Configurable Metadata-Based Automation and Content Classification Architecture for Cloud-Based Collaboration Platforms.
"Revolving sync conflicts; frequently asked questions," Microsoft Tech Support, Jul. 16, 2012, retrieved from the Internet: http://web.archive.org/web, 2 pages.
"Troubleshoot sync problems," Microsoft Tech Support: May 2, 2012, retrieved from the Internet, http://web.Archive.org/web, 3 pages.
"Tulsa TechFest 2012—Agenda," retrieved from the website, http://web.archive.org, Oct. 2, 2012, 2 pages.

Cohen, "Debating the Definition of Cloud Computing Platforms," retrieved from the internet, http://forbes.com, Feb. 3, 2014, 7 pages.
Delendik, "Evolving with Web Standards—The Story of PDF.JS," retrieved from the internet, http://people.mozilla.org, Oct. 12, 2012, 36 pages.
Delendik, "My PDF.js talk slides from Tulsa TechFest," retrieved from the internet, http://twitter.com, Oct. 12, 2012, 2 pages.
Duffy, "The Best File-Syncing Services," pcmag.com, retrieved from the internet: http://www.pcmag.com, Sep. 28, 2012, 7 pages.
Exam Report for EP13177108.1, Applicant: Box, Inc. dated May 26, 2014, 6 pages.
Exam Report for GB1318792.7, Applicant: Box, Inc. dated May 22, 2014, 2 pages.
Partial Search Report for EP131832800, Applicant: Box, Inc. dated May 8, 2014, 5 pages.
Pyle et al., "How to enable Event logging for Offline Files (Client Side Caching) in Windows Vista," Feb. 18, 2009, retrieved from the internet: http://blogs.technet.com, 3 pages.
Rao, "Box Acquires Crocodoc to Add HTML5 Document Converter and Sleek Content Viewing Experience to Cloud Storage Platform," retrieved from the internet, http://techcrunch.com, May 9, 2013, 8 pages.
Search Report for EP13187217.8, Applicant: Box, Inc. dated Apr. 15, 2014, 12 pages.
Search Report for EP141509422, Applicant: Box, Inc. dated May 8, 2014, 7 pages.
Sommerer, "Presentable Document Format: Improved On-demand PDF to HTML Conversion," retrieved from the internet, http://research.microsoft.com, 8 pages.
Tulloch et al., "Windows Vista Resource Kit," Apr. 8, 2007, Microsoft Press, XP055113067, 6 pages.
Walker, "PDF.js project meeting notes," retrieved from the internet, http://groups.google.com, May 15, 2014, 1 page.

* cited by examiner

CLOUD-BASED PLATFORM ENABLED WITH MEDIA CONTENT INDEXED FOR TEXT-BASED SEARCHES AND/OR METADATA EXTRACTION

CROSS-REFERENCE TO RELATED APPLICATIONS

This application claims priority to and benefit from U.S. Provisional Application No. 61/702,948, entitled "CLOUD-BASED PLATFORM ENABLED WITH MEDIA CONTENT INDEXED FOR TEXT-BASED SEARCHES AND/OR METADATA EXTRACTION", filed Sep. 19, 2012, which is incorporated by reference herein.

BACKGROUND

The ever-increasing computing power and widespread use of a variety of audio/visual equipment (e.g., smart phones equipped with microphones, audio and/or video recorders, high definition signal outputs, and cameras) has made multimedia files more and more integrated in all aspects of everyday life. As such, there is a need to effectively manage, store, and share multimedia files in various environments including enterprise-based or social settings.

BRIEF DESCRIPTION OF DRAWINGS

The present embodiments are illustrated by way of example and are not intended to be limited by the figures of the accompanying drawings. In the drawings.

The same reference numbers and any acronyms identify elements or acts with the same or similar structure or functionality throughout the drawings and specification for ease of understanding and convenience.

DETAILED DESCRIPTION

Figure 1:
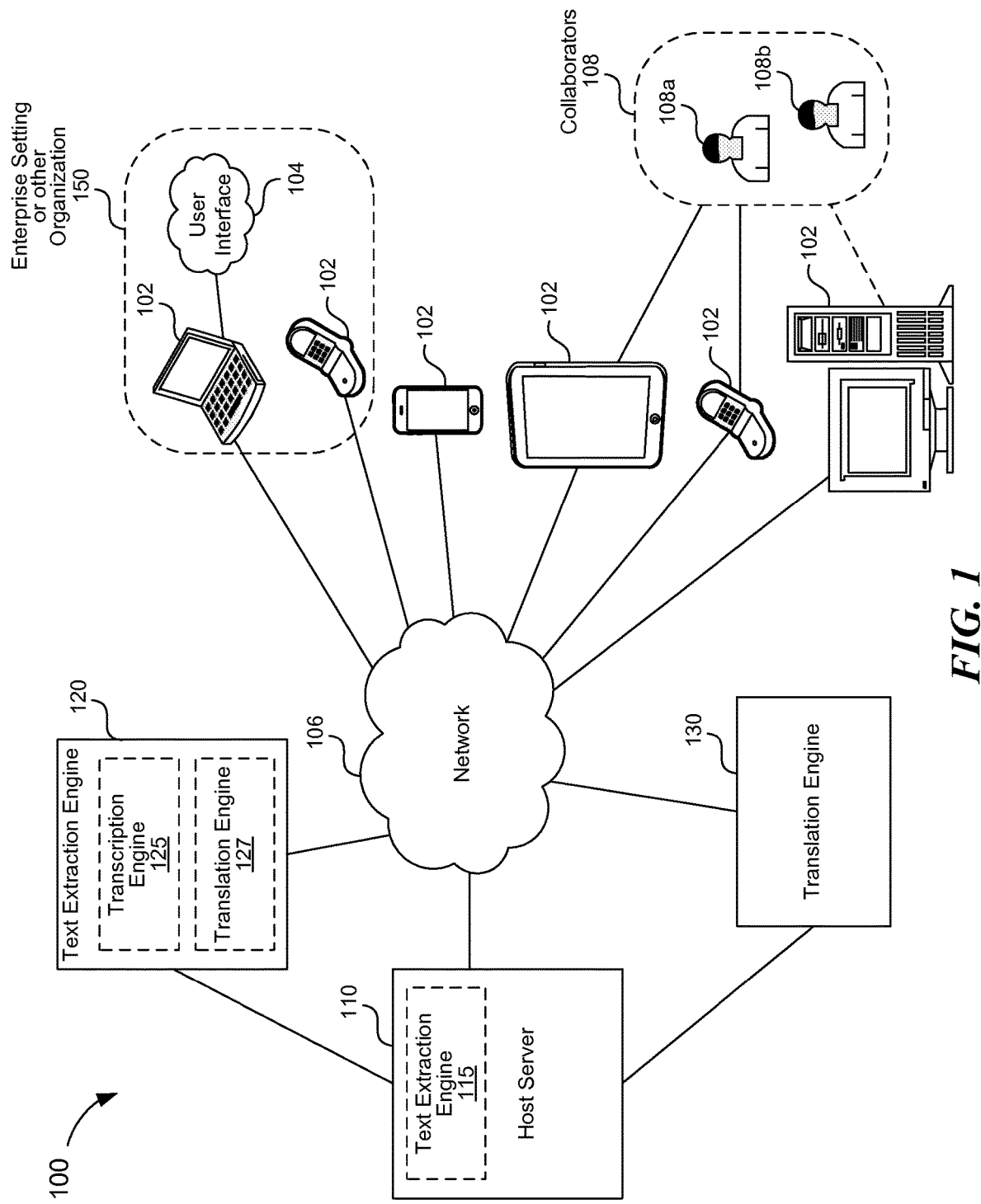
FIG. 1 depicts an example diagram of a system having a host server of a cloud service and/or cloud storage accounts with capabilities that enable indexing of media content, text-searching, and/or metadata extraction of media content.

Techniques are disclosed for enabling collaborative work on a media content among collaborators through a cloud-based environment. An example method comprises receiving the media content; extracting a plurality of text-based data based on the media content; and indexing the plurality of text-based data so as to enable one or more actions to be performed on the media content using the plurality of text-based data. In some embodiments, the media content comprises an audio component, and the method further comprises transcribing the audio component of the media content so that the plurality of text-based data comprises a transcript of the media content. In some embodiments, the actions include a text-based search or a semantics-based search. Among other benefits, some embodiments provided herein enable indexing media content for text-based searches and/or metadata extraction in order to effectively manage multimedia files and increase collaborative productivity in a cloud-based storage/service environment. The media content can include any audio, video, audiovisual/multimedia content or any combination of the above, which can be indexed (e.g., indexed based on text extracted) for various purposes in the cloud-based platform, including but not limited to search, metadata tracking and/or data aggregation/extraction purposes of content shared, stored, distributed, and/or collaborated upon in the cloud-based platform (e.g., cloud-based file sharing service/collaboration service/storage service, etc.).

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

FIG. 1 illustrates an example diagram of a system 100 having a host server of a cloud service and/or cloud storage accounts with capabilities that enable indexing of media content, text-searching, and/or metadata extraction of media content.

The client devices 102 can be any system and/or device, and/or any combination of devices/systems that is able to establish a connection, including wired, wireless, cellular connections with another device, a server and/or other systems such as host server 110, a text extraction engine 120, and/or a translation engine 130. Client devices 102 typically include a display and/or other output functionalities to present information and data exchanged between among the devices 102, the text extraction engine 120, the translation engine 130, and/or the host server 110.

For example, the client devices 102 can include mobile, hand held or portable devices or non-portable devices and can be any of, but not limited to, a server desktop, a desktop computer, a computer cluster, or portable devices including, a notebook, a laptop computer, a handheld computer, a palmtop computer, a mobile phone, a cell phone, a PDA, a smart phone (e.g., a BlackBerry device such as BlackBerry Z10/Q10, an iPhone, Nexus 4, etc.), a Treo, a handheld tablet (e.g. an iPad, iPad Mini, a Galaxy Note, Galaxy Note II, Xoom Tablet, Microsoft Surface, Blackberry PlayBook, Nexus 7, 10 etc.), a phablet (e.g., HTC Droid DNA, etc.), a tablet PC, a thin-client, a hand held console, a hand held gaming device or console (e.g., XBOX live, Nintendo DS, Sony PlayStation Portable, etc.), iOS powered watch, Google Glass, a Chromebook and/or any other portable, mobile, hand held devices, etc. running on any platform or any operating system (e.g., Mac-based OS (OS X, iOS, etc.), Windows-based OS (Windows Mobile, Windows 7, Windows 8, etc.), Android, Blackberry OS, Embedded Linux platforms, Palm OS, Symbian platform, Google Chrome OS, and the like. In one embodiment, the client devices 102, host server 100, and app server 110 are coupled via a network 106. In some embodiments, the devices 102 and host server 100 may be directly connected to one another.

The input mechanism on client devices 102 can include touch screen keypad (including single touch, multi-touch, gesture sensing in 2D or 3D, etc.), a physical keypad, a mouse, a pointer, a track pad, motion detector (e.g., including 1-axis, 2-axis, 3-axis accelerometer, etc.), a light sensor, capacitance sensor, resistance sensor, temperature sensor, proximity sensor, a piezoelectric device, device orientation detector (e.g., electronic compass, tilt sensor, rotation sensor, gyroscope, accelerometer), or a combination of the above.

Signals received or detected indicating user activity at client devices 102 through one or more of the above input mechanism, or others, can be used by various users or collaborators (e.g., collaborators 108) for accessing, through network 106, a web-based collaboration environment or online collaboration platform (e.g., hosted by the host server 110). The collaboration environment or platform can have one or more collective settings 150 for an enterprise or an organization that the users belong, and can provide an user interface 104 for the users to access such platform under the settings 150.

The collaboration platform or environment hosts workspaces with work items that one or more users can access (e.g., view, edit, update, revise, comment, download, preview, tag, or otherwise manipulate, etc.). A work item can generally include any type of digital or electronic content that can be viewed or accessed via an electronic device (e.g., device 102). The digital content can include .pdf files, .doc, slides (e.g., Powerpoint slides), images, audio files, multimedia content, web pages, blogs, etc. A workspace can generally refer to any grouping of a set of digital content in the collaboration platform. The grouping can be created, identified, or specified by a user or through other means. This user may be a creator user or administrative user, for example.

In general, a workspace can be associated with a set of users or collaborators (e.g., collaborators 108) which have access to the content included therein. The levels of access (e.g., based on permissions or rules) of each user or collaborator to access the content in a given workspace may be the same or may vary among the users. Each user may have their own set of access rights to every piece of content in the workspace, or each user may be different access rights to different pieces of content. Access rights may be specified by a user associated with a workspace and/or a user who created/uploaded a particular piece of content to the workspace, or any other designated user or collaborator.

The collaboration platform allows multiple users or collaborators to access or collaborate efforts on work items such each user can see, remotely, edits, revisions, comments, or annotations being made to specific work items through their own user devices. For example, a user can upload a document to a workspace for other users to access (e.g., for viewing, editing, commenting, signing-off, or otherwise manipulating). The user can login to the online platform and upload the document (or any other type of work item) to an existing workspace or to a new workspace. The document can be shared with existing users or collaborators in a workspace.

Generally, network 106, over which the client devices 102, the text extraction engine 120, the translation engine 130, and the host server 110 communicate may be a cellular network, a telephonic network, an open network, such as the Internet, or a private network, such as an intranet and/or the extranet, or any combination or variation thereof. For example, the Internet can provide file transfer, remote log in, email, news, RSS, cloud-based services, instant messaging, visual voicemail, push mail, VoIP, and other services through any known or convenient protocol, such as, but is not limited to the TCP/IP protocol, Open System Interconnections (OSI), FTP, UPnP, iSCSI, NSF, ISDN, PDH, RS-232, SDH, SONET, etc.

The network 106 can be any collection of distinct networks operating wholly or partially in conjunction to provide connectivity to the client devices 102 and the host server 110 and may appear as one or more networks to the serviced systems and devices. In one embodiment, communications to and from the client devices 102 can be achieved by, an open network, such as the Internet, or a private network, such as an intranet and/or the extranet. In one embodiment, communications can be achieved by a secure communications protocol, such as secure sockets layer (SSL), or transport layer security (TLS).

In addition, communications can be achieved via one or more networks, such as, but are not limited to, one or more of WiMax, a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), enabled with technologies such as, by way of example, Global System for Mobile Communications (GSM), Personal Communications Service (PCS), Digital Advanced Mobile Phone Service (D-Amps), Bluetooth, Wi-Fi, Fixed Wireless Data, 2G, 2.5G, 3G, 4G, IMT-Advanced, pre-4G, 3G LTE, 3GPP LTE, LTE Advanced, mobile WiMax, WiMax 2, WirelessMAN-Advanced networks, enhanced data rates for GSM evolution (EDGE), General packet radio service (GPRS), enhanced GPRS, iBurst, UMTS, HSPDA, HSUPA, HSPA, UMTS-TDD, 1×RTT, EV-DO, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks or messaging protocols.

The embodiments disclosed herein recognize that, with the growing prevalence of the communication networks (e.g., the Internet) and portable multimedia devices (e.g., smart phones), there are many varieties of media files that need to be indexed, searched, and accessed through a cloud-based service/storage environment to best facilitate an effective and integrated collaboration experience. However, it has always been challenging to index, search, and/or manage a media file by its content because the discrepancy in specifying the content. A conventional method is to name the title and/or a plurality of metadata fields of the media file to express the contents of the media file, such as naming the file as "Uncle Sam's Birthday Party 2013 Lake Tahoe.avi." However, this method is limited in its usefulness due to lack of completeness and accuracy, mainly resulted from the limited length of title and/or metadata fields, and from the arbitrariness when entering these data.

Accordingly, embodiments of the present disclosure provide systems and methods that provide a cloud-based platform enabled with media content indexed for text-based searches and/or metadata extraction. The media content can include any audio, video, audiovisual/multimedia content or any combination of the above, and can be stored and/or shared in the workspaces hosted by the server 110. Further, the media or multimedia content can be indexed (e.g., based on a plurality of text data that are extracted from the media content, discussed in more details below) for various purposes in the cloud-based platform, including but not limited to search, metadata tracking and/or data aggregation/extraction purposes of content shared, stored, distributed, and/or collaborated upon in the cloud-based platform (e.g., cloud-based file sharing service/collaboration service/storage service, etc.). The text or other metadata extraction and/or indexing and/or translating can be in part or in whole performed by the cloud-based platform (e.g., using the text extraction engine 115 the server 110), or in part or in whole performed by an external server or third party entity (e.g., using the transcription engine 125 or the translation engine 130) coupled to the host server 110 via the network 106.

It is noted that the configuration shown in FIG. 1 is merely an example. According to the embodiments disclosed herein, various components including, for example, the text extraction engines, the transcription engines, and the translations engines, may each in part or in whole locate on the host server 110 (e.g., the text extraction engine 115) or on a third-party server (e.g., the text extraction engine 120 or the translation engine 130). Further, employment of a component does not necessarily require exclusion of another. For example, in some embodiments, the host server 110 may employ any one or both of the internal text extraction engine 115 and the external text extraction engine 125 for purposes of extracting text-based data from the media contents stored on the host server 110.

More implementation details regarding the host server 110 and its various interactions and/or functions with the various components are discussed below with reference to FIGS. 2-5.

Figure 2:
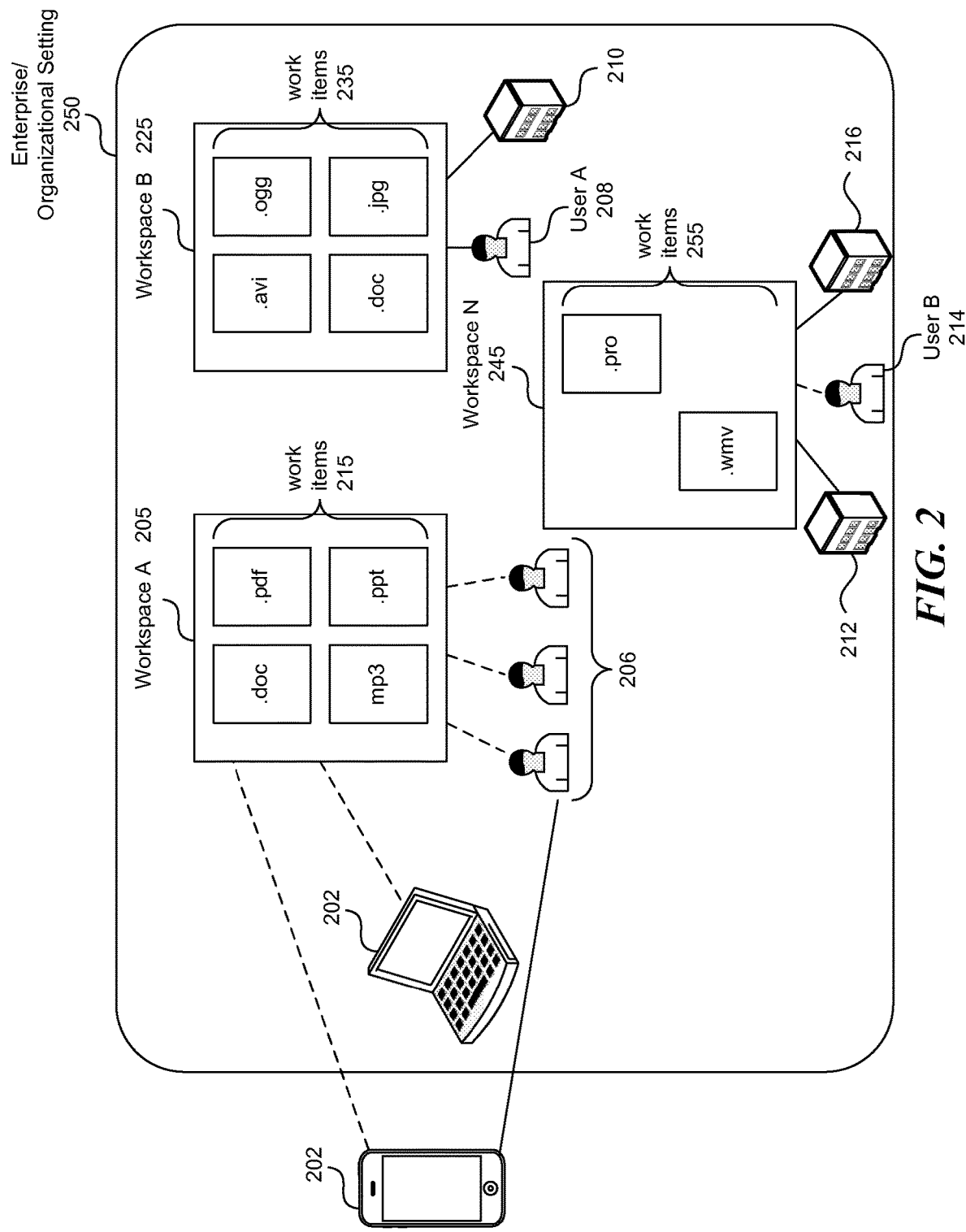
FIG. 2 depicts a diagram of a web-based or online collaboration platform (e.g., cloud-enabled platform) deployed in an enterprise or other organizational setting for organizing work items and workspaces, as one example of a hosted cloud service and/or cloud storage with capabilities that enable indexing of media content, text-searching, and/or metadata extraction of media content.

FIG. 2 depicts a diagram of a web-based or online collaboration platform deployed in an enterprise or other organizational setting 250 for organizing work items 215, 235, 255 and workspaces 205, 225, 245, as one example of a hosted cloud service and/or cloud storage with capabilities that enable indexing of media content, text-searching, and/or metadata extraction of media content.

The web-based platform for collaborating on projects or jointly working on documents can be used by individual users and shared among collaborators. In addition, the collaboration platform can be deployed in an organized setting including but not limited to, a company (e.g., an enterprise setting), a department in a company, an academic institution, a department in an academic institution, a class or course setting, or any other types of organizations or organized setting.

When deployed in an organizational setting, multiple workspaces (e.g., workspace A, B C) can be created to support different projects or a variety of work flows. Each workspace can have its own associate work items. For example, workspace A 205 may be associated with work items 215, workspace B 225 can be associated with work items 235, and workspace N can be associated with work items 255. The work items 215, 235, and 255 may be unique to each workspace but need not be. For example, a particular word document can be associated with only one workspace (e.g., workspace A 205) or it may be associated with multiple workspaces (e.g., workspace A 205 and workspace B 225, etc.).

In general, each workspace has a set of users or collaborators associated with it. For example, workspace A 205 is associated with multiple users or collaborators 206. In some instances, workspaces deployed in an enterprise may be department specific. For example, workspace B may be associated with department 210 and some users shown as example user A 208 and workspace N 245 can be associated with departments 212 and 216 and users shown as example user B 214.

Each user associated with a workspace can generally access the work items associated with the workspace. The level of access will depend on permissions associated with the specific workspace, and/or with a specific work item. Permissions can be set for the workspace or set individually on a per work item basis. For example, the creator of a workspace (e.g., one of user A 208 who creates workspace B) can set one permission setting applicable to all work items 235 for other associated users and/or users associated with the affiliate department 210, for example. Creator user A 208 may also set different permission settings for each work item, which may be the same for different users, or varying for different users.

The files shared in workspaces can include media content of any format. In particular, media content can also be shared, collaborated upon, commented upon or stored for access, editing, or otherwise modified by other users or collaborators. According to the embodiments discloses herein, effective collaborative work on a media content among collaborators through a cloud-based environment can be enabled. With reference to FIG. 1, in one or more embodiments, the host server (e.g., server 110) of the cloud-based workspaces receives the media content and extracts a plurality of text-based data based on the media content. The extraction may be performed by the server 110 employing a text extraction engine, which may be located on the host server 110 itself (e.g., engine 115) or may be located on a remote or a third-party server (e.g., engine 120). The server 110 may notify a group of the collaborators 206 after the server 110 finishes the extraction of the text-based data from the media content.

Alternatively, the extraction may be performed on a user device 202 at where a text extraction engine (not shown for simplicity) may be located. In the alternative embodiments, the media content may be stored locally inside the device 202 or may be stored in the cloud-based environment (e.g., in workspace A as work items 215). For example, the user device 202 may download and install a client software application that performs extraction, transcription, translations, and/or other functions (e.g., synchronization) on the text-based data from the media content provided in the cloud-based environment for collaboration. In a particular example, the user device 202 extracts the text-based data from the media content and uploads the text-based data to be indexed at the server 110 that provides the cloud-based service.

After the extraction of the text-based data, the host server 110 indexes the plurality of text-based data so as to enable one or more actions to be performed on the media content using the plurality of text-based data. According to some implementations, the actions may include a text-based search, a semantics-based search, and/or other suitable forms of searches. The actions may also include a search on one or more of the collaborators associated with the media content including, for example, when such collaborators are assigned to, open, comment on, or otherwise edit the media content.

In some instances, the media content includes an audio component, and the server 110 uses a transcription engine (e.g., engine 125) that may be included in the text extraction engine 120 to transcribe the audio component so that the text-based data includes a transcript of the media content. Note that, although not shown in FIG. 1 for simplicity, one or more embodiments of the text extraction engine 115 may also include such transcription engine. Moreover, in one embodiment, the host server 110 may further use a translation engine (e.g., engine 130) to translate the transcript into a different language. The translation engine may be included in the text extraction engine 115 (not shown for simplicity), may be included in the text extraction engine 120 (e.g., engine 127), and/or may be located on a stand-alone server or a third-party server (e.g., engine 130).

For example, if the media content is a sound or a video recording of a meeting, then upon receiving the media content (e.g., in workspace 205 as a work item 215), the server 110 may (either automatically or manually) start to extract the text-based data from the sound recording so that a transcript of the meeting may be generated. After the extraction, the server 110 indexes the transcript so that one or more collaborators 206 may perform a text-based search or a semantics-search on the media content (e.g., on the transcript) using one or more keywords. Moreover, the audio-text conversion process and/or machine translation can be performed on any part or all parts of the media or multimedia content. The audio-text conversion and/or translation of media content enable searches of media content in a given work item (item 215), across multiple work items in a given workspace (e.g., workspace 205), or across workspaces (e.g., workspaces 205, 225, and 255). According to the present embodiments, because the text-based data are directly extracted from a content of the media file and are not subject to arbitrariness or randomness of human input, they may serve as a more complete and accurate basis for facilitating actions such as searches and/or analyses on the media content in a collaborative cloud-based environment, thereby increasing efficiency and productivity in performing such actions.

In some embodiments, the text extraction engine (e.g., engine 115) may also extract metadata containing information about the media. The indexed media content can be used for other applications other than search such as extraction of metadata to enable keyword searches and/or semantics-based searches. For one implementation, the metadata may be extracted based on the extracted text-based data for searches and/or other actions. As an additional or an alternative implementation, existing metadata may be extracted in addition to the extracted text-based data (e.g., the transcript) for searches and/or other actions. The metadata may include, by way of example, one or more of (i) date, (ii) time, (iii) author, (iv) file type, or (v) genre of the media content.

Further, the host server 110 of cloud-based services and/or cloud storage such as an online or web-based collaboration environment may be able to track or monitor the devices used by users to access the media content or other activities. In each workspace A, B . . . N, when an action is performed on the media content (e.g., as a work item) by a given user or any other activity is detected in the workspace, other users in the same workspace may be notified (e.g., in real time or in near real time, or not in real time). Activities which trigger real time notifications can include, by way of example but not limitation, adding, deleting, or modifying collaborators in the workspace, uploading, downloading, adding, deleting a work item in the workspace, creating a discussion topic in the workspace.

According to some embodiments, actions such as having media content downloaded or edited can cause notifications to be generated. Such notifications can be sent to relevant users to notify them of actions surrounding a download, an edit, a change, a modification, a new file, a conflicting version, an upload of an edited or modified file. In one or more embodiments, the server 110 provides a copy of the text-based data extracted from the media content to each member of a group of the collaborators 206. The group may include all persons or a subset of all persons that are included in the collaborators 206 of workspace A, and/or may optionally include additional users in other workspaces such as user 208. After an action or a change is performed by a collaborator, the user device 220 notifies server 110 regarding the change. The server 110 receives the change, and synchronizes all copies of the text-based data to reflect the change. Therefore, if any edit or change is performed to the text-based data by any one of the group of the collaborators 206, all copies are automatically synchronized. The server 110 may also delivering a message regarding the change, and the message may include an identification of a user who made the change.

In some embodiments, in a user interface to the web-based collaboration platform where notifications are presented, users can, via the same interface, create action items (e.g., tasks) and delegate the action items to other users including collaborators pertaining to a work item 215, for example. The collaborators 206 may be in the same workspace A 205 or the user may include a newly invited collaborator. Similarly, in the same user interface where discussion topics can be created in a workspace (e.g., workspace A, B or N, etc.), actionable events on work items can be created and/or delegated/assigned to other users such as collaborators of a given workspace 206 or other users. Through the same user interface, task status and updates from multiple users or collaborators can be indicated and reflected. In some instances, the users can perform the tasks (e.g., review or approve or reject, etc.) via the same user interface.

Besides the techniques discussed above, some embodiments provides that the text-indexed media content can further enable, for example, collection of useful analytics regarding users 206, 208, 214 of the cloud-based system, extraction of information regarding media content shared or stored in the cloud-based platform to identify any trends, popular topics among enterprises 250, or across enterprises.

Figure 3:
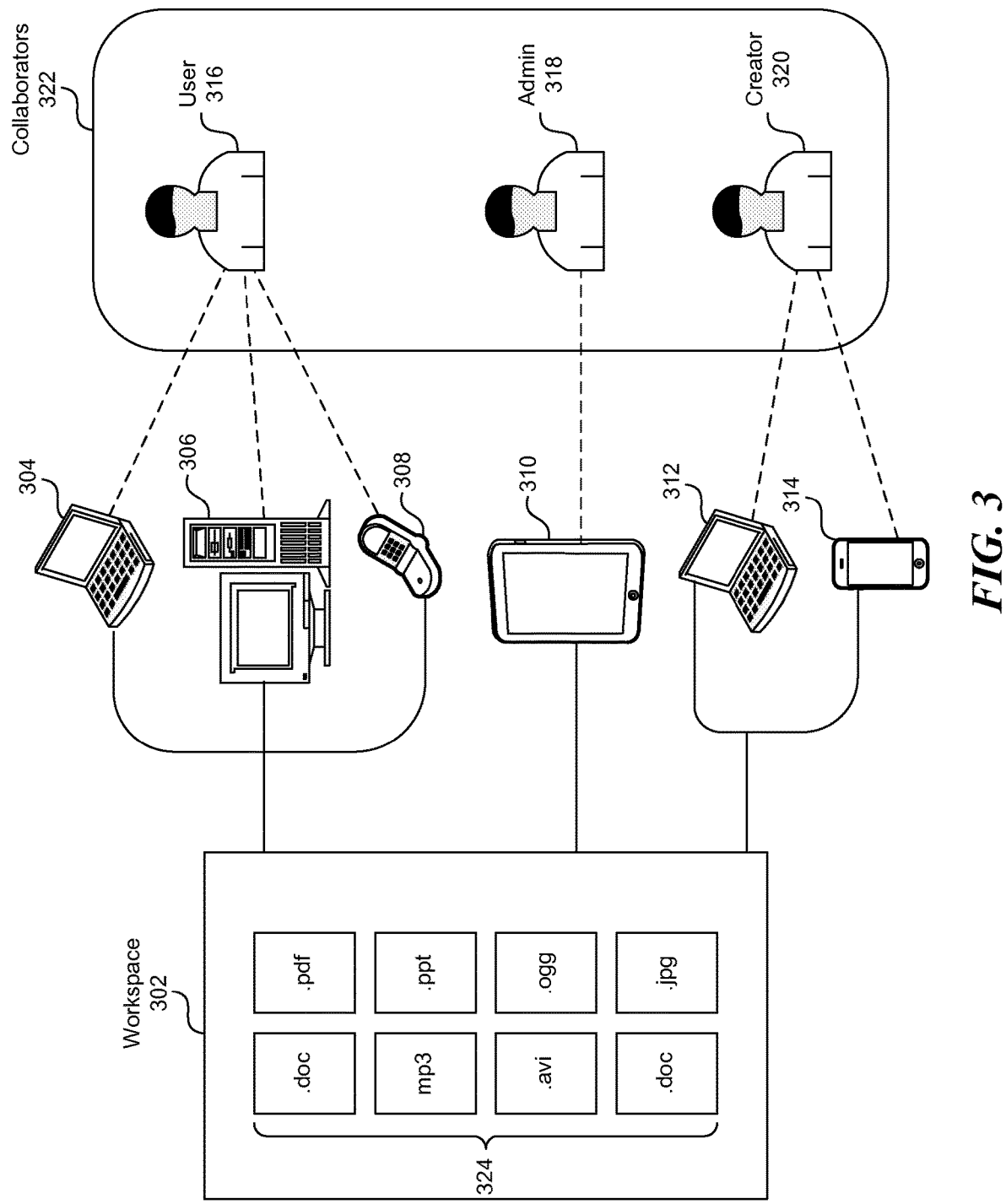
FIG. 3 depicts an example diagram of a workspace in an online or web-based collaboration environment accessible by multiple collaborators through various devices authorized to access media contents in the workspace.

FIG. 3 depicts an example diagram of a workspace 302 in an online or web-based collaboration environment accessible by multiple collaborators 211 through various devices authorized to access media contents in the workspace.

Each of users 316, 318, and 320 can individually use multiple different devices to access and/or manipulate media contents (e.g., work items 324) in the work space 302 with which they are associated with. For example users 316, 318, 320 can be collaborators on a project to which work items 324 are relevant. Since the work items 324 are hosted by the collaboration environment (e.g., a cloud-based environment), each user can access the work items 324 anytime, and from any physical location using any device (e.g., including devices they own or any shared/public/loaner device).

Text-based data extracted from the media contents (e.g., using the aforementioned techniques) may be edited, viewed, or otherwise accessed from the workspace 302 in accordance with the platform and/or application independent mechanisms. Users can also be notified of access, edit, modification, and/or upload related-actions performed on the text-based data by other users or any other types of activities detected in the work space 302. For example, if user 316 modifies a sentence of a transcript that is included in the text-based data, one or both of the other collaborators 318 and 320 can be notified of the modification in real time, or near real-time, or not in real time. The notifications can be sent through any of all of the devices associated with a given user, in various formats including, one or more of, email, SMS, or via a pop-up window in a user interface in which the user uses to access the collaboration platform. In the event of multiple notifications, each notification can be depicted preferentially (e.g., ordering in the user interface) based on user preferences and/or relevance to the user (e.g., implicit or explicit).

For example, a notification of a download, access, read, write, edit, or uploaded related activities can be presented in a feed stream among other notifications through a user interface on the user device according to relevancy to the user determined based on current or recent activity of the user in the web-based collaboration environment.

In one embodiment, a notification feed stream includes updates when an invited user accepts an invitation and/or successfully creates a new account through receipt of an invitation from an existing user. The invited user, upon creation of the new account, receives the account having enhanced features. The new user can automatically be connected to the existing user who sent the invitation. The system can also automatically prompt both users to query they wish to be collaborators in a common work space.

Figure 4:
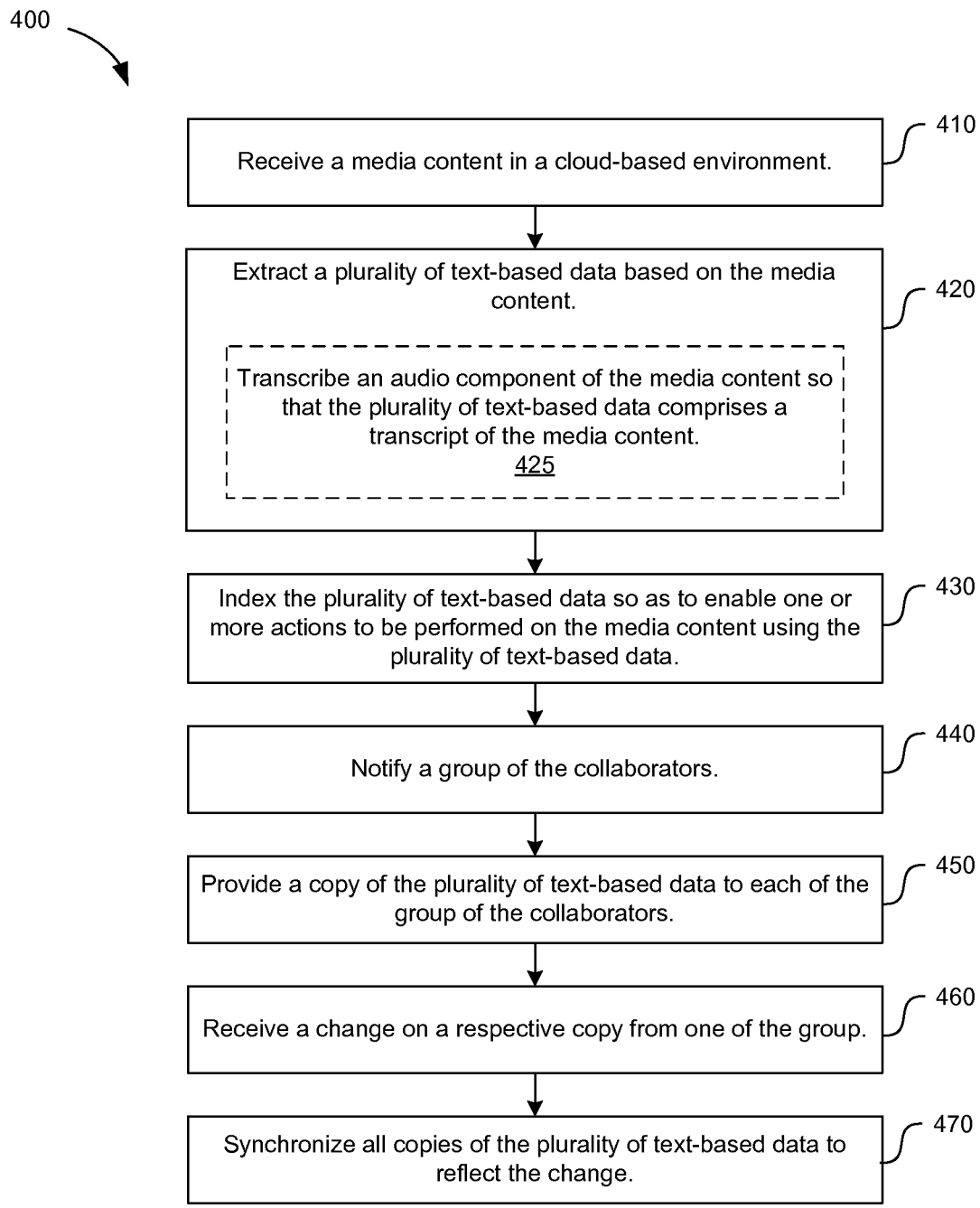
FIG. 4 depicts a flowchart illustrating an example process performed on a host server of a cloud-based service and/or cloud storage with capabilities that enable indexing of media content, text-searching, and/or metadata extraction of media content.

FIG. 4 depicts a flowchart illustrating an example process 400 performed on a host server of a cloud-based service and/or cloud storage with capabilities that enable indexing of media content, text-searching, and/or metadata extraction of media content. For example, after a user records a meeting using a smart phone, the user may want to upload the recording as a work item for collaborators to review and comment.

First, with reference to FIGS. 1-2, the host server (e.g., server 110, FIG. 1) receives (410) a media content (e.g., the recording of the meeting) from a user using a user device (e.g., device 102, FIG. 1; or device 202, FIG. 2). According to the embodiments disclosed herein, the server 110 enables collaborative work on the recording among collaborators (e.g., collaborators 108, FIG. 1; or collaborators 206, FIG. 2) of the user. Then, the server 110 extracts (420) a plurality of text-based data based on the recording. Depending on the implementation, the extraction is performed via a text extraction engine, which may be located on the server 110 (e.g., engine 115, FIG. 1) or may be located on a remote server or a third-party server (e.g., engine 120, FIG. 1). In some embodiments, the server 110 employs a transcription engine to transcribe (425) an audio component of recording so that the plurality of text-based data comprises a transcript of the recording. The transcription engine may be within the text extraction engine (e.g., engine 125), and may be configured to transcribe a select portion of the audio component. As an additional option, in some embodiments, the transcription is translated into a different language by a translation engine, which may be located within the text extraction engine (e.g., engine 127) or may be on a stand-alone or a third-party server (e.g., engine 130).

Thereafter, the server 110 indexes (430) the plurality of text-based data so as to enable one or more actions to be performed on the media content using the plurality of text-based data. According to some implementations, the actions may include a text-based search, a semantics-based search, and/or other suitable forms of searches. The actions may also include a search on one or more of the collaborators associated with the media content.

In some embodiments, the server 110 notifies (440) a group of the collaborators 108, 206 after the extraction and/or indexing are performed. Optionally, the server 110 may also provide (450) a copy of the plurality of text-based data to each of the group of the collaborators. If any one of the group of collaborators 108, 206 performs a change on his or her copy, then the server 110 receives (460) a change on a respective copy from one of the group. The server 110 synchronizes (470) all copies of the plurality of text-based data to reflect the change.

Figure 5:
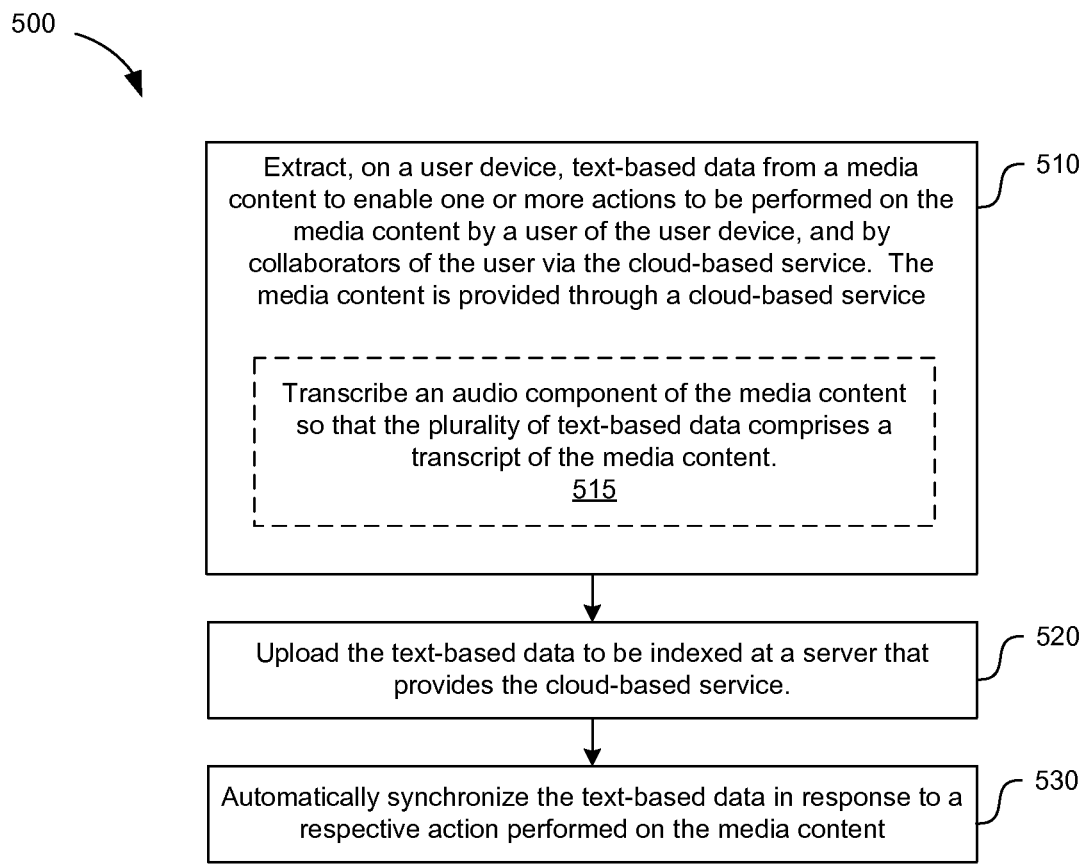
FIG. 5 depicts a flowchart illustrating an example process performed on a user device of a cloud-based service and/or cloud storage with capabilities that enable indexing of media content, text-searching, and/or metadata extraction of media content.

FIG. 5 depicts a flowchart illustrating an example process 500 performed on a user device of a cloud-based service and/or cloud storage with capabilities that enable indexing of media content, text-searching, and/or metadata extraction of media content. For example, after a first user records a meeting using a smart phone, the first user uploads the recording as a work item, and a second user (e.g., a collaborator) wants to review and comment. In this example, the extraction may, as an option, be performed on the user device.

First, with reference to FIGS. 1-2, a program that is installed on the user device (e.g., device 202, FIG. 2) may extract (510) text-based data from a media content (e.g., the recording) to enable one or more actions to be performed on the recording by a user (e.g., the first user) of the user device, and by collaborators (e.g., the second user) of the user via the cloud-based service. The recording is provided through a cloud-based service. Optionally, the device 202 transcribes (515) an audio component of the media content so that the plurality of text-based data comprises a transcript of the media content.

In some embodiments, after the extraction, the device 202 uploads (520) the text-based data to be indexed at a host server (e.g., server 110, FIG. 1) that provides the cloud-based service. In accordance with one or more embodiments, the device 202 automatically synchronizes (530) with the server 110 the text-based data in response to a respective action performed on the media content so that the text-based data are up-to-date.

Figure 6:
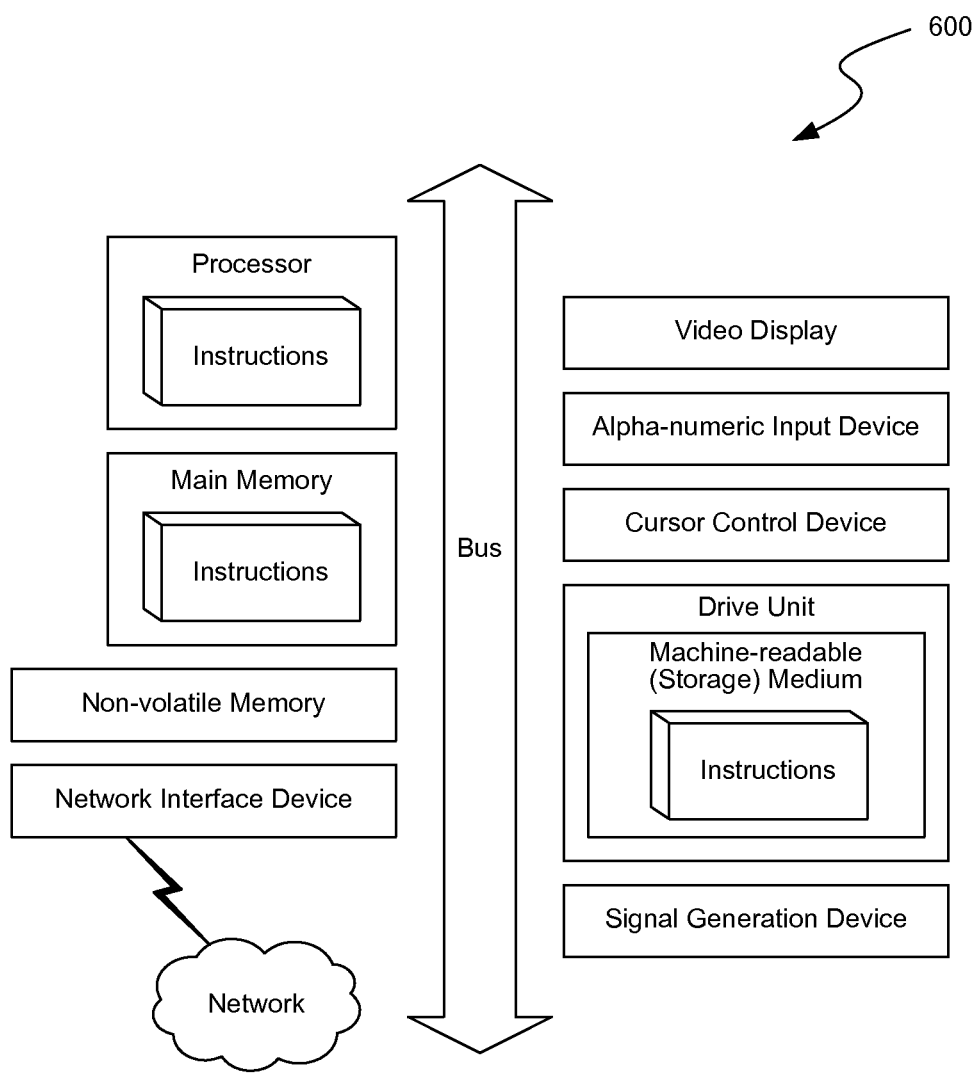
FIG. 6 depicts a diagrammatic representation of a machine in the example form of a computer system within which a set of instructions, for causing the machine to perform any one or more of the methodologies discussed herein, may be executed.

FIG. 6 shows a diagrammatic representation 600 of a machine in the example form of a computer system within which a set of instructions, for causing the machine to perform any one or more of the methodologies discussed herein, may be executed.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a user device, a tablet PC, a laptop computer, a set-top box (STB), a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by that machine.

While the machine-readable medium or machine-readable storage medium is shown in an example embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

The network interface device enables the machine 2800 to mediate data in a network with an entity that is external to the host server, through any known and/or convenient communications protocol supported by the host and the external entity. The network interface device can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network interface device can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

Other network security functions can be performed or included in the functions of the firewall, can be, for example, but are not limited to, intrusion-prevention, intrusion detection, next-generation firewall, personal firewall, etc. without deviating from the novel art of this disclosure.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further, any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112,¶6, other aspects may likewise be embodied as a means-plus-function claim, or in other forms, such as being embodied in a computer-readable medium. (Any claim intended to be treated under 35 U.S.C. § 112,¶6 begins with the words "means for".) Accordingly, the applicant reserves the right to add additional claims after filing the application to pursue such additional claim forms for other aspects of the disclosure.

What is claimed is:

1. A method for enabling collaboration on a media content via a server that hosts a cloud-based environment, the method comprising:
    determining a type of media content for each media content item of a plurality of media content items in a collaborative workspace of the cloud-based environment, the type of media content comprising a text-based data type or an audio component type;
    extracting text-based data from each media content item determined to be an audio component type by transcribing audio of the media content item, the audio comprises a recording of a user of the media content items in the collaborative workspace;
    extracting content metadata from the transcription of the audio of the media content item, wherein the content metadata corresponds to the media content item, includes keyword searchable information about the media content extract from the transcribed audio of the media content item, and includes a plurality of fields of fixed maximum length;
    specifying the content metadata in a normalized format;
    indexing the content metadata in the normalized format for facilitating a plurality of actions performed on the indexed content metadata in the normalized format in the cloud-based environment, wherein the plurality of actions comprise performing a text-based or semantic-based search on the content of the metadata and searching on one or more collaborators associated with the content item in the collaborative workspace;
    generating, by the cloud-based environment, analytics regarding the users of the media content items in the collaborative workspace from the indexed content metadata, wherein the analytics are associated with the media content items; and
    identifying, based on the analytics associated with the media content items, one or more trends among the users of the media content items in the collaborative workspace or popular content in the media content.

2. The method of claim 1, wherein the text-based data enables the collaboration on the media content among collaborators via the cloud-based environment from various different locations or using different devices.

3. The method of claim 1, further comprising: translating, using a translation engine, the transcription into a different language.

4. The method of claim 2, further comprising:
    notifying a group of the collaborators after the extracting; and
    enabling editing or other collaborative actions to be performed on the text-based data among the group of the collaborators.

5. The method of claim 4, further comprising:
    detecting the collaborative actions performed on the media content item based on the actions performed on the text-based data.

6. The method of claim 5, further comprising:
    notifying the group of collaborators in real time or in near real time of the collaborative actions performed on the media content item, wherein the notifying includes an identification of a collaborator who made the change.

7. The method of claim 6, wherein the indexed content metadata in the normalized format comprises one or more of: (i) date; (ii) time; (iii) author; (iv) file type; or (v) genre.

8. The method of claim 1, wherein the media content item comprises one or more of: (i) imagery or pictorial content;

(ii) audiovisual content; (iii) musical content; (iv) graphic content; or (v) literary content.

9. The method of claim 1, wherein the extracting is performed on the server which hosts the cloud-based environment, on another server that is remote from the server, or on a third-party server.

10. A method for enabling, by a server providing a cloud-based service, collaboration on media content, the method comprising:
determining a type of media content for a media content item in a collaborative workspace of the cloud-based environment, the type of media content comprising a text-based data type and an audio component type;
extracting, on a user device, text-based data from each media content item determined to be an audio component type by transcribing the audio of the media content item, the audio comprises a recording of a user of the media content items in the collaborative workspace;
extracting, on the user device, content metadata from the transcription of the audio of the media content item to enable actions to be performed on the media content item by collaborators of the user via the cloud-based service, wherein the content metadata corresponds to the media content item, includes keyword searchable information about the media content extract from the transcribed audio of the media content item, and includes a plurality of fields of fixed maximum length;
specifying the content metadata in a normalized format;
indexing the content metadata in the normalized format for facilitating a plurality of actions performed on the media content item by the collaborators of the user via the cloud-based service, wherein collaboration on the media content item by the collaborators of the user is provided through the cloud-based service, and wherein the plurality of actions comprise performing a text-based or semantic-based search on the content of the metadata and searching on one or more collaborators associated with the content item in the collaborative workspace;
generating, by the cloud-based environment, analytics regarding the users of the media content item from the indexed content metadata, wherein the analytics are associated with the media content item; and
identifying, based on the analytics associated with the media content item, one or more trends among the users of the media content in the collaborative workspace or popular content in the media content.

11. The method of claim 10, wherein the server is further configured for:
synchronizing the content metadata in the normalized format, in response to a respective action performed on the media content item.

12. The method of claim 11, further comprising:
receiving a message regarding the respective action, wherein the message includes an identification of who performed the respective action.

13. The method of claim 11, wherein the respective action includes one or more of: (i) commenting, (ii) editing, (iii) highlighting, or (iv) accepting or rejecting previously made changes.

14. The method of claim 10, further comprising: translating, by a translation engine, the transcription into a different language.

15. A system for enabling collaborative work on media content among collaborators through a cloud-based environment, the system comprising:
a processor;
a memory having stored thereon instructions which, when executed by the processor, causes the system to:
determine a type of media content for each media content item in a collaborative workspace of the cloud-based environment, the media content type comprising a text-based data type or an audio component type;
extract text-based data from each media content item determined to be the audio component type by transcribing the audio of the media content item, the audio comprises a recording of a user of the media content items in the collaborative workspace;
extract content metadata from the transcription of the audio of the media content item, wherein the content metadata corresponds to the media content item, includes keyword searchable information about the media content extract from the transcribed audio of the media content item, and includes a plurality of fields of fixed maximum length;
specify the content metadata in a normalized format;
index the content metadata in the normalized format to enable a plurality of actions performed on the indexed content metadata in the normalized format, wherein the plurality of actions comprise performing a text-based or semantic-based search on the content of the metadata and searching on one or more collaborators associated with the content item in the collaborative workspace;
generate, by the cloud-based environment, analytics regarding the users of the media content item from the indexed content metadata, wherein the analytics are associated with the media content; and
identify, based on the analytics associated with the media content item, one or more trends among the users of the media content items in the collaborative workspace or popular content in media content.

16. The system of claim 15, further comprising a translation engine to translate the transcription of the media content into a different language.

17. The system of claim 15, wherein the group of the collaborators is notified responsive to extraction of the text-based data.

18. The system of claim 15, wherein the system is further caused to:
enable editing or other collaborative actions to be performed on the text-based data among the group of the collaborators.

19. The system of claim 18, wherein the system is further caused to: detect the collaborative actions performed on the media content item based on the actions performed on the text-based data.

20. The system of claim 19, wherein the system is further caused to: notify the group of collaborators in real time or in near real time of the collaborative actions performed on the media content item, wherein the notification includes an identification of a collaborator who made the change.

21. The system of claim 15, wherein the text-based data further comprises information including one or more of: (i) date; (ii) time; (iii) author; (iv) file type; or (v) genre.

22. The system of claim 15, wherein the media content item comprises one or more of: (i) imagery or pictorial content; (ii) audiovisual content; (iii) musical content; (iv) graphic content; or (v) literary content.

23. A non-transitory machine-readable storage medium having stored thereon instructions which, when executed by a processor, causes the processor to:
- determine a type of media content for each media content item in a collaborative workspace of the cloud-based environment, the media content type comprising a text-based data type or an audio component type;
- extract text-based data from each media content item determined to be the audio component type by transcribing the audio of the media content item, the audio comprises a recording of a user of the media content items in the collaborative workspace;
- extract content metadata from the transcription of the audio of the media content item, wherein the content metadata corresponds to the media content item, includes keyword searchable information about the media content extract from the transcribed audio of the media content item, and includes a plurality of fields of fixed maximum length;
- specify the content metadata in a normalized format;
- index the content metadata in the normalized format for facilitating a plurality of actions performed on the media content by a user of the user device, and by collaborators of the user via a cloud-based service, wherein the plurality of actions comprise performing a text-based or semantic-based search on the content of the metadata and searching on one or more collaborators associated with the content item in the collaborative workspace;
- generate, by the cloud-based environment, analytics regarding the users of the media content items in the collaborative workspace from the indexed content metadata, wherein the analytics are associated with the media content item; and
- identify, based on the analytics associated with the media content item, one or more trends among the users of the media content times in the collaborative workspace or popular content in the media content.

24. The non-transitory machine-readable storage medium of claim 23, wherein the instructions further cause the processor to:
automatically synchronize the text-based data in response to a respective action performed on the media content item.

25. The non-transitory machine-readable storage medium of claim 24, wherein the instructions when executed further cause the processor to:
automatically receive a message regarding the respective action, wherein the message includes an identification of who performance the respective action.

26. The non-transitory machine-readable storage medium of claim 24, wherein the respective action includes one or more of: (i) commenting, (ii) editing, (iii) highlighting, or (iv) accepting or rejecting previously made changes.

27. The non-transitory machine-readable storage medium of claim 23, wherein the instructions when executed further cause the processor to:
upload the text-based data to the server that provides the cloud-based service.

28. The non-transitory machine-readable storage medium of claim 23, wherein the instructions when executed further cause the processor to:
translate the transcription into a different language.

* * * * *